(12) United States Patent
Matsui et al.

(10) Patent No.: US 6,972,773 B2
(45) Date of Patent: Dec. 6, 2005

(54) DISPLAY CONTROL APPARATUS AND DISPLAY CONTROL METHOD

(75) Inventors: Takeshi Matsui, Tokyo (JP); Tomohiro Nishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 376 days.

(21) Appl. No.: 09/909,714

(22) Filed: Jul. 20, 2001

(65) Prior Publication Data

US 2002/0021303 A1 Feb. 21, 2002

(51) Int. Cl.$^7$ .............................................. G06G 5/10
(52) U.S. Cl. ........................ 345/611; 345/97; 345/690; 345/82; 345/207; 348/148
(58) Field of Search .................... 345/611, 82, 207, 345/690–694, 148, 97; 382/148

(56) References Cited

U.S. PATENT DOCUMENTS

| | | | | |
|---|---|---|---|---|
| 4,323,896 A | * | 4/1982 | Fiedler et al. ............... 345/691 |
| 4,586,089 A | * | 4/1986 | Nakazato et al. ........... 358/461 |
| 5,278,652 A | * | 1/1994 | Urbanus et al. ............ 348/571 |
| 5,319,629 A | * | 6/1994 | Henshaw et al. ........... 369/103 |
| 5,337,171 A | * | 8/1994 | Mase et al. .................... 349/74 |
| 5,442,411 A | * | 8/1995 | Urbanus et al. ............ 348/771 |
| 5,508,711 A | * | 4/1996 | Okada .......................... 345/97 |
| 5,699,078 A | * | 12/1997 | Yamazaki et al. ............ 345/89 |
| 5,715,385 A | * | 2/1998 | Stearns et al. ......... 340/310.01 |
| 5,963,187 A | * | 10/1999 | Tanaka et al. ................ 345/97 |
| 5,969,710 A | * | 10/1999 | Doherty et al. ............. 345/693 |
| 6,064,359 A | * | 5/2000 | Lin et al. ...................... 345/89 |
| 6,115,019 A | * | 9/2000 | Perner .......................... 345/98 |
| 6,144,366 A | * | 11/2000 | Numazaki et al. .......... 345/156 |
| 6,175,355 B1 | * | 1/2001 | Reddy ......................... 345/691 |
| 6,226,054 B1 | * | 5/2001 | Morgan et al. ............. 348/759 |
| 6,246,386 B1 | * | 6/2001 | Perner .......................... 345/90 |
| 6,310,588 B1 | * | 10/2001 | Kawahara et al. ............ 345/63 |
| 6,329,971 B2 | * | 12/2001 | McKnight .................... 345/95 |
| 6,388,661 B1 | * | 5/2002 | Richards .................... 345/204 |
| 6,476,824 B1 | * | 11/2002 | Suzuki et al. ............... 345/690 |
| 6,529,640 B1 | * | 3/2003 | Utagawa et al. ............ 382/284 |
| 6,563,511 B1 | * | 5/2003 | Yeh et al. ................... 345/611 |
| 6,573,928 B1 | * | 6/2003 | Jones et al. ................... 348/51 |
| 6,750,875 B1 | * | 6/2004 | Keely et al. ................ 345/613 |
| 6,897,855 B1 | * | 5/2005 | Matthies et al. ............ 345/204 |
| 2001/0040588 A1 | * | 11/2001 | Shiraiwa et al. ............ 345/690 |

* cited by examiner

*Primary Examiner*—Jeffery Brier
*Assistant Examiner*—J. Amini
(74) *Attorney, Agent, or Firm*—Sonnenschein, Nath & Rosenthal LLP

(57) ABSTRACT

The invention provides a display control apparatus and a display control method wherein, where digital gradation display is performed, occurrences of a moving picture pseudo contour can be reduced simply. A signal production circuit produces a signal for driving a display section so that light of divisional light amounts obtained by dividing light amounts corresponding to bits which compose digital values which are pixel values may be emitted in a such manner as to be distributed within a time corresponding to one screen. In this instance, where both of a first light amount corresponding to a predetermined bit and a second light amount corresponding to a bit in a lower order by one bit to the bit are divided, the first and second light amounts are divided so that the division number of the first light amount may be smaller than twice the division number of the second light amount.

11 Claims, 35 Drawing Sheets

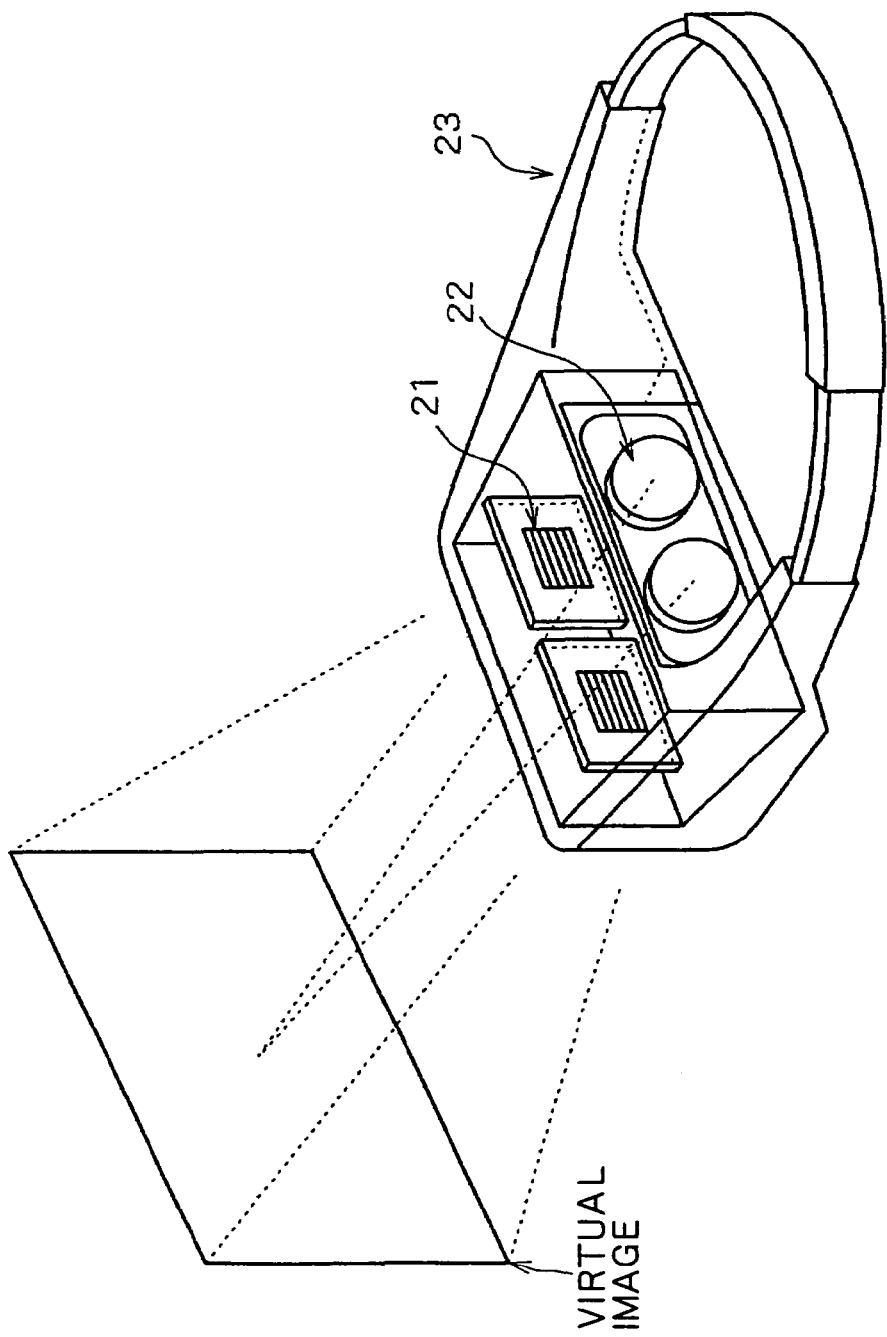

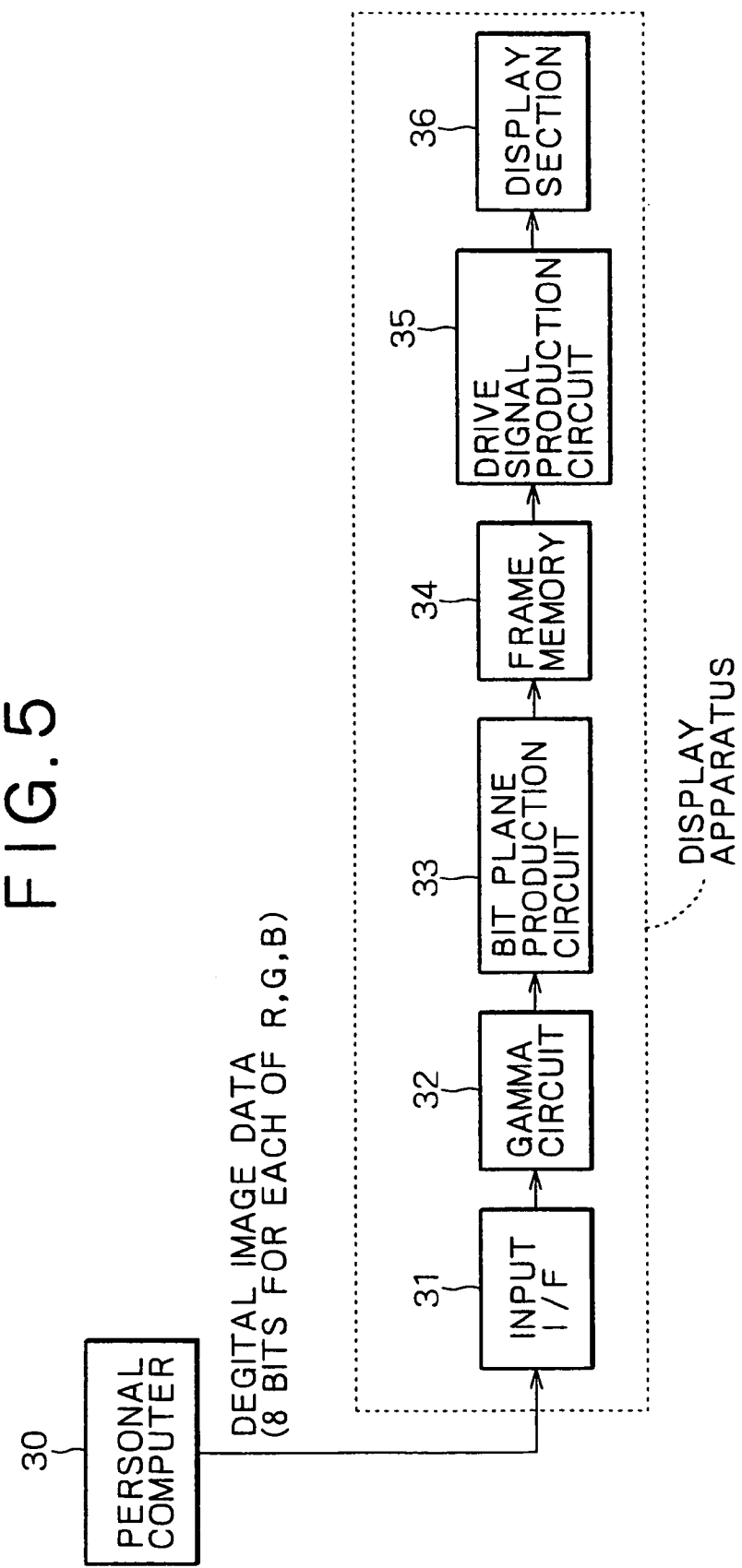

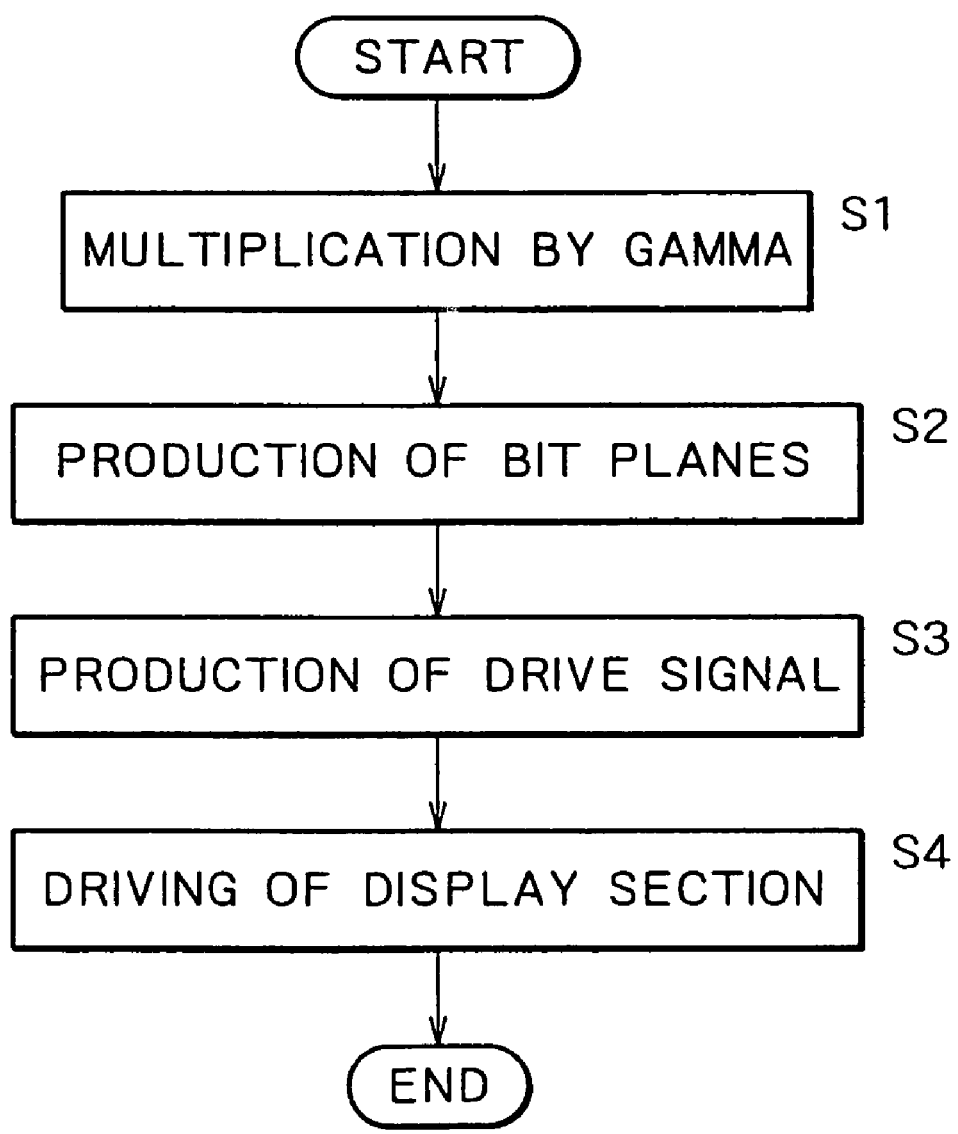

F I G. 9A
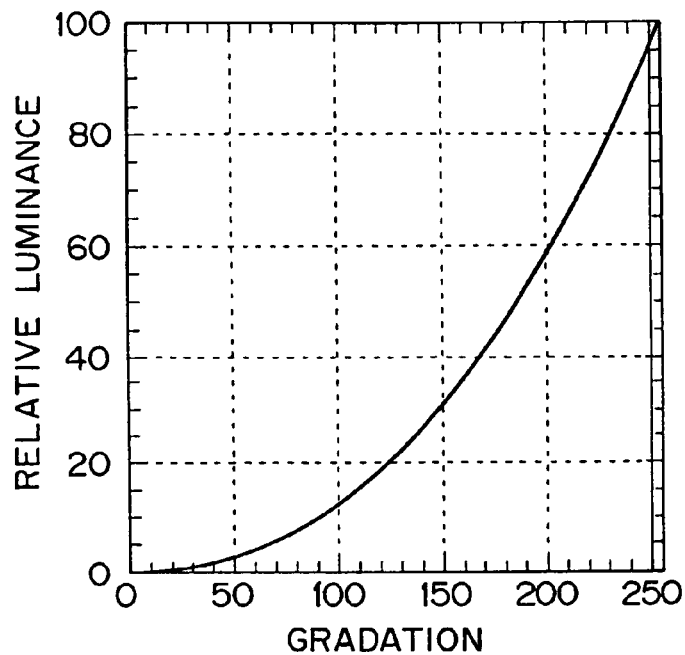
F I G. 9B
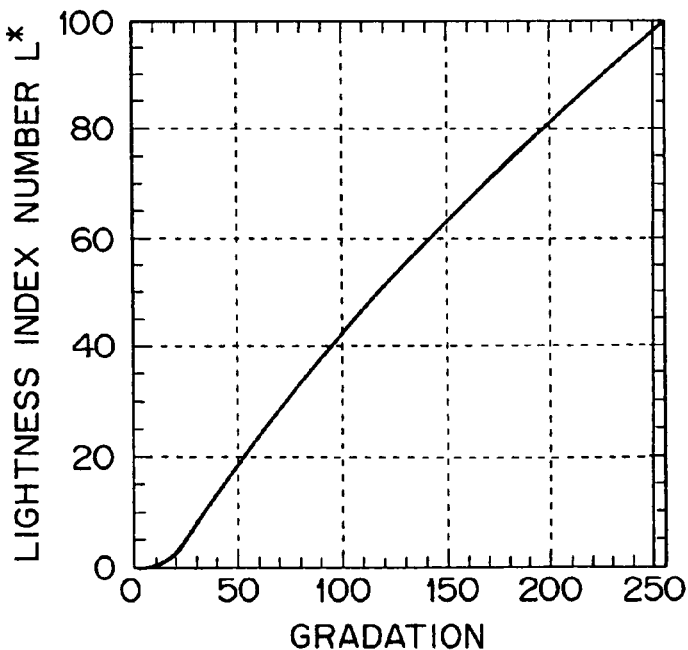

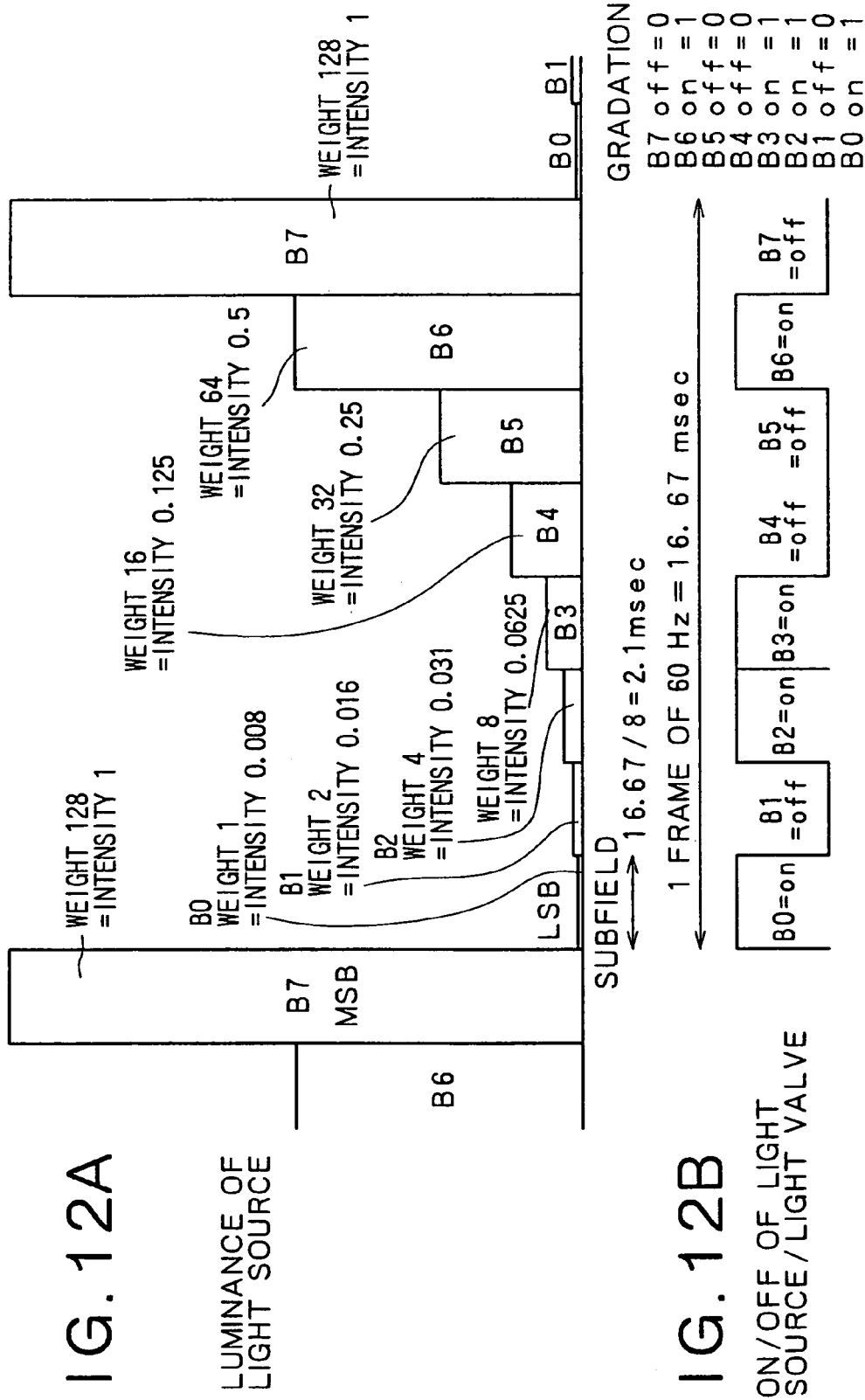

ENLARGED

GRADATION 0    GRADATION 255

256 GRADATIONS×2 PIXELS/
GRADATION = 512 PIXELS

10 PIXELS/FRAME = 600 PIXELS/
1 SECOND
WHEN 1 FRAME = 60 Hz

640/480 DISPLAY HORIZONTALLY 640 PIXELS → 1.1 SECONDS
800/600 DISPLAY HORIZONTALLY 800 PIXELS → 1.3 SECONDS
1024/768 DISPLAY HORIZONTALLY 1024 PIXELS → 1.7 SECONDS
1280/1024 DISPLAY HORIZONTALLY 1280 PIXELS → 2.1 SECONDS
1600/1200 DISPLAY HORIZONTALLY 1600 PIXELS → 2.6 SECONDS

FIG. 15

| (A) | (B) | (C) | (D) | | | | | | | |
|---|---|---|---|---|---|---|---|---|---|---|
| 8-BIT LINEAR | γ2.2 | 8-BIT INTEGER | B0 | B1 | B2 | B3 | B4 | B5 | B6 | B7 |
| 0 | 0.0 | 0 | 0 | 0 | 0 | 0 | 0 | 0 | 0 | 0 |
| 1 | 0.0 | 0 | 0 | 0 | 0 | 0 | 0 | 0 | 0 | 0 |
| 2 | 0.0 | 0 | 0 | 0 | 0 | 0 | 0 | 0 | 0 | 0 |
| 3 | 0.0 | 0 | 0 | 0 | 0 | 0 | 0 | 0 | 0 | 0 |
| 4 | 0.0 | 0 | 0 | 0 | 0 | 0 | 0 | 0 | 0 | 0 |
| 5 | 0.0 | 0 | 0 | 0 | 0 | 0 | 0 | 0 | 0 | 0 |
| 6 | 0.1 | 0 | 0 | 0 | 0 | 0 | 0 | 0 | 0 | 0 |
| 7 | 0.1 | 0 | 0 | 0 | 0 | 0 | 0 | 0 | 0 | 0 |
| 8 | 0.1 | 0 | 0 | 0 | 0 | 0 | 0 | 0 | 0 | 0 |
| 9 | 0.2 | 0 | 0 | 0 | 0 | 0 | 0 | 0 | 0 | 0 |
| 10 | 0.2 | 0 | 0 | 0 | 0 | 0 | 0 | 0 | 0 | 0 |
| 11 | 0.3 | 0 | 0 | 0 | 0 | 0 | 0 | 0 | 0 | 0 |
| 12 | 0.3 | 0 | 0 | 0 | 0 | 0 | 0 | 0 | 0 | 0 |
| 13 | 0.4 | 0 | 0 | 0 | 0 | 0 | 0 | 0 | 0 | 0 |
| 14 | 0.4 | 0 | 0 | 0 | 0 | 0 | 0 | 0 | 0 | 0 |
| 15 | 0.5 | 1 | 1 | 0 | 0 | 0 | 0 | 0 | 0 | 0 |
| 16 | 0.6 | 1 | 1 | 0 | 0 | 0 | 0 | 0 | 0 | 0 |
| 17 | 0.7 | 1 | 1 | 0 | 0 | 0 | 0 | 0 | 0 | 0 |
| 18 | 0.7 | 1 | 1 | 0 | 0 | 0 | 0 | 0 | 0 | 0 |
| 19 | 0.8 | 1 | 1 | 0 | 0 | 0 | 0 | 0 | 0 | 0 |
| 20 | 0.9 | 1 | 1 | 0 | 0 | 0 | 0 | 0 | 0 | 0 |
| 21 | 1.0 | 1 | 1 | 0 | 0 | 0 | 0 | 0 | 0 | 0 |
| 22 | 1.2 | 1 | 1 | 0 | 0 | 0 | 0 | 0 | 0 | 0 |
| 23 | 1.3 | 1 | 1 | 0 | 0 | 0 | 0 | 0 | 0 | 0 |
| 24 | 1.4 | 1 | 1 | 0 | 0 | 0 | 0 | 0 | 0 | 0 |
| 25 | 1.5 | 2 | 0 | 1 | 0 | 0 | 0 | 0 | 0 | 0 |
| 26 | 1.7 | 2 | 0 | 1 | 0 | 0 | 0 | 0 | 0 | 0 |
| 27 | 1.8 | 2 | 0 | 1 | 0 | 0 | 0 | 0 | 0 | 0 |
| 28 | 2.0 | 2 | 0 | 1 | 0 | 0 | 0 | 0 | 0 | 0 |
| 29 | 2.1 | 2 | 0 | 1 | 0 | 0 | 0 | 0 | 0 | 0 |
| 30 | 2.3 | 2 | 0 | 1 | 0 | 0 | 0 | 0 | 0 | 0 |
| (OMITTED) | | | | | | | | | | |
| 241 | 225.2 | 225 | 1 | 0 | 0 | 0 | 0 | 1 | 1 | 1 |
| 242 | 227.3 | 227 | 1 | 1 | 0 | 0 | 0 | 1 | 1 | 1 |
| 243 | 229.3 | 229 | 1 | 0 | 1 | 0 | 0 | 1 | 1 | 1 |
| 244 | 231.4 | 231 | 1 | 1 | 1 | 0 | 0 | 1 | 1 | 1 |
| 245 | 233.5 | 234 | 0 | 1 | 0 | 1 | 0 | 1 | 1 | 1 |
| 246 | 235.6 | 236 | 0 | 0 | 1 | 1 | 0 | 1 | 1 | 1 |
| 247 | 237.7 | 238 | 0 | 1 | 1 | 1 | 0 | 1 | 1 | 1 |
| 248 | 239.9 | 240 | 0 | 0 | 0 | 0 | 1 | 1 | 1 | 1 |
| 249 | 242.0 | 242 | 0 | 1 | 0 | 0 | 1 | 1 | 1 | 1 |
| 250 | 244.1 | 244 | 0 | 0 | 1 | 0 | 1 | 1 | 1 | 1 |
| 251 | 246.3 | 246 | 0 | 1 | 1 | 0 | 1 | 1 | 1 | 1 |
| 252 | 248.4 | 248 | 0 | 0 | 0 | 1 | 1 | 1 | 1 | 1 |
| 253 | 250.6 | 251 | 1 | 1 | 0 | 1 | 1 | 1 | 1 | 1 |
| 254 | 252.8 | 253 | 1 | 0 | 1 | 1 | 1 | 1 | 1 | 1 |
| 255 | 255.0 | 255 | 1 | 1 | 1 | 1 | 1 | 1 | 1 | 1 |

FIG. 16A SUBFIELD
FIG. 16B DIVISION

FIG. 18A  FIG. 18B

| SUBFIELD | B7-1 | B6-1 | B7-2 | B5-1 | B7-3 | B6-2 | B7-4 | B4 | B2 | B0 | B1 | B3 | B7-5 | B6-3 | B7-6 | B5-2 | B7-7 | B6-4 | B7-8 | | | LIGHT AMOUNT | NORMALIZED LIGHT AMOUNT |
|---|---|---|---|---|---|---|---|---|---|---|---|---|---|---|---|---|---|---|---|---|---|---|---|
| TIME | 1040 | 1040 | 1040 | 1040 | 1040 | 1040 | 1040 | 1040 | 260 | 65 | 130 | 520 | 1040 | 1040 | 1040 | 1040 | 1040 | 1040 | 1040 | μsec | | | |
| ACCUMULATED | 1040 | 2080 | 3120 | 4160 | 5200 | 6240 | 7280 | 8320 | 8580 | 8645 | 8775 | 9295 | 10335 | 11375 | 12415 | 13445 | 14495 | 15535 | 16575 | μsec | | | |
| MOVEMENT PIXEL NUMBER | 1 | 1 | 2 | 3 | 3 | 4 | 4 | 5 | 5 | 5 | 5 | 6 | 6 | 7 | 7 | 8 | 9 | 9 | 10 | | | | |
| NORMALIZED LIGHT AMOUNT | | | | | | | | | | | | | | | | | | | | | | | |
| 1 | o | o | o | o | o | o | o | o | o | o | o | o | o | o | o | o | o | o | o | | | 0.0 | 0.0000 |
| 2 | o | o | o | o | o | o | o | o | o | o | o | o | o | o | o | o | o | o | o | | | 0.0 | 0.0000 |
| 3 | o | o | o | o | o | o | o | o | o | o | o | o | o | o | o | o | o | o | o | | | 0.0 | 0.0000 |
| 4 | o | o | o | o | o | o | o | o | o | o | o | o | o | o | o | o | o | o | o | | | 0.0 | 0.0000 |
| 5 | o | o | o | o | o | o | o | o | o | o | o | o | o | o | o | o | o | o | o | | | 0.0 | 0.0000 |
| 6 | o | o | o | o | o | o | o | o | o | o | o | o | o | o | o | o | o | o | o | | | 0.0 | 0.0000 |
| 7 | o | o | o | o | o | o | o | o | o | o | o | o | o | o | o | o | o | o | o | | | 0.0 | 0.0000 |
| 8 | o | o | o | o | o | o | o | o | o | o | o | o | o | o | o | o | o | o | o | | | 0.0 | 0.0000 |
| 9 | o | o | o | o | o | o | o | o | o | o | o | o | o | o | o | o | o | o | o | | | 0.0 | 0.0000 |
| 10 | o | o | o | o | o | o | o | o | o | o | o | o | o | o | o | o | o | o | o | | | 0.0 | 0.0000 |
| (OMITTED) | | | | | | | | | | | | | | | | | | | | | | | |
| 270 | o | o | o | o | o | o | o | o | o | o | o | o | o | o | o | o | 1 | 1 | 1 | | | 60.0 | 0.2353 |
| 271 | o | o | o | o | o | o | o | o | o | o | o | o | o | o | o | o | 1 | 1 | 1 | | | 60.0 | 0.2353 |
| 272 | o | o | o | o | o | o | o | o | o | o | o | o | o | o | o | 1 | 1 | 1 | 1 | | | 61.0 | 0.2392 |
| 273 | o | o | o | o | o | o | o | o | o | o | o | o | o | o | o | 1 | 1 | 1 | 1 | | | 61.0 | 0.2392 |
| 274 | o | o | o | o | o | o | o | o | o | o | o | 1 | 1 | 1 | 1 | 1 | 1 | 1 | 1 | | | 78.0 | 0.3059 |
| (OMITTED) | | | | | | | | | | | | | | | | | | | | | | | |
| 514 | 1 | 1 | 1 | 1 | 1 | 1 | 1 | 1 | 1 | 1 | 1 | 1 | 1 | 1 | 1 | 1 | 1 | 1 | 1 | | | 221.0 | 0.8667 |
| 515 | 1 | 1 | 1 | 1 | 1 | 1 | 1 | 1 | 1 | 1 | 1 | 1 | 1 | 1 | 1 | 1 | 1 | 1 | 1 | | | 205.0 | 0.8039 |
| 516 | 1 | 1 | 1 | 1 | 1 | 1 | 1 | 1 | 1 | 1 | 1 | 1 | 1 | 1 | 1 | 1 | 1 | 1 | 1 | | | 175.0 | 0.6863 |
| 517 | 1 | 1 | 1 | 1 | 1 | 1 | 1 | 1 | 1 | 1 | 1 | 1 | 1 | 1 | 1 | 1 | 1 | 1 | 1 | | | 143.0 | 0.5608 |
| 518 | 1 | 1 | 1 | 1 | 1 | 1 | 1 | 1 | 1 | 1 | 1 | 1 | 1 | 1 | 1 | 1 | 1 | 1 | 1 | | | 120.0 | 0.4706 |
| 519 | 1 | 1 | 1 | 1 | 1 | 1 | 1 | 1 | 1 | 1 | 1 | 1 | 1 | 1 | 1 | 1 | 1 | 1 | 1 | | | 96.0 | 0.3765 |
| 520 | 1 | 1 | 1 | 1 | 1 | 1 | 1 | 1 | 1 | 1 | 1 | 1 | 1 | 1 | 1 | 1 | 1 | 1 | 1 | | | 64.0 | 0.2510 |
| 521 | 1 | 1 | 1 | 1 | 1 | 1 | 1 | 1 | 1 | 1 | 1 | 1 | 1 | 1 | 1 | 1 | 1 | 1 | 1 | | | 48.0 | 1.1882 |
| 522 | 1 | 1 | 1 | 1 | 1 | 1 | 1 | 1 | 1 | 1 | 1 | 1 | 1 | 1 | 1 | 1 | 1 | 1 | 1 | | | 16.0 | 1.0627 |

F I G. 19A
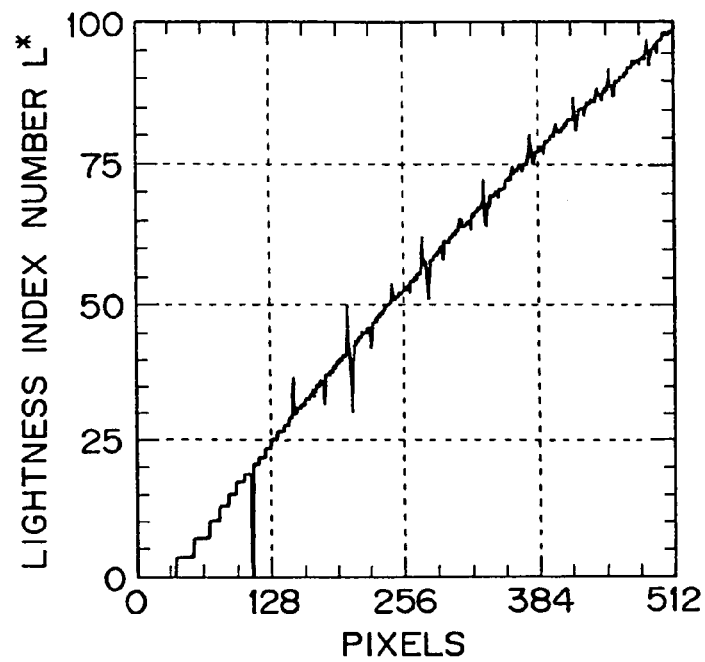
F I G. 19B
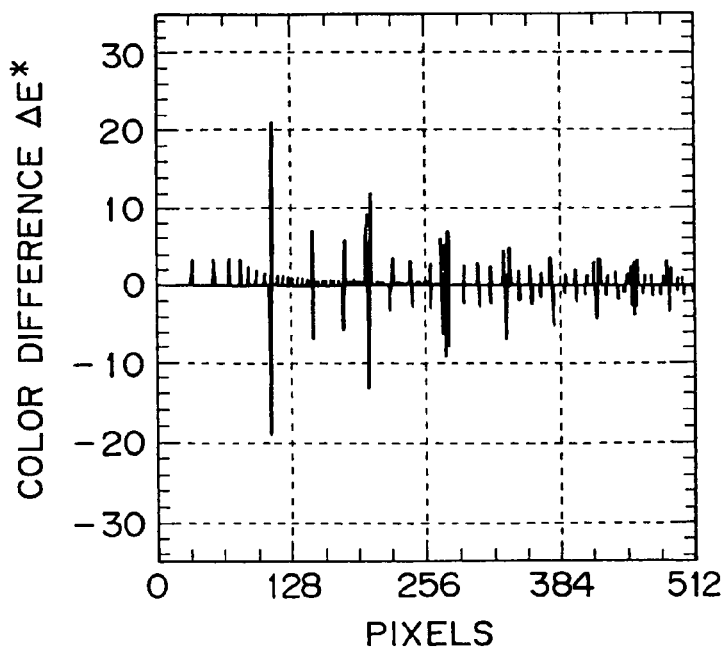

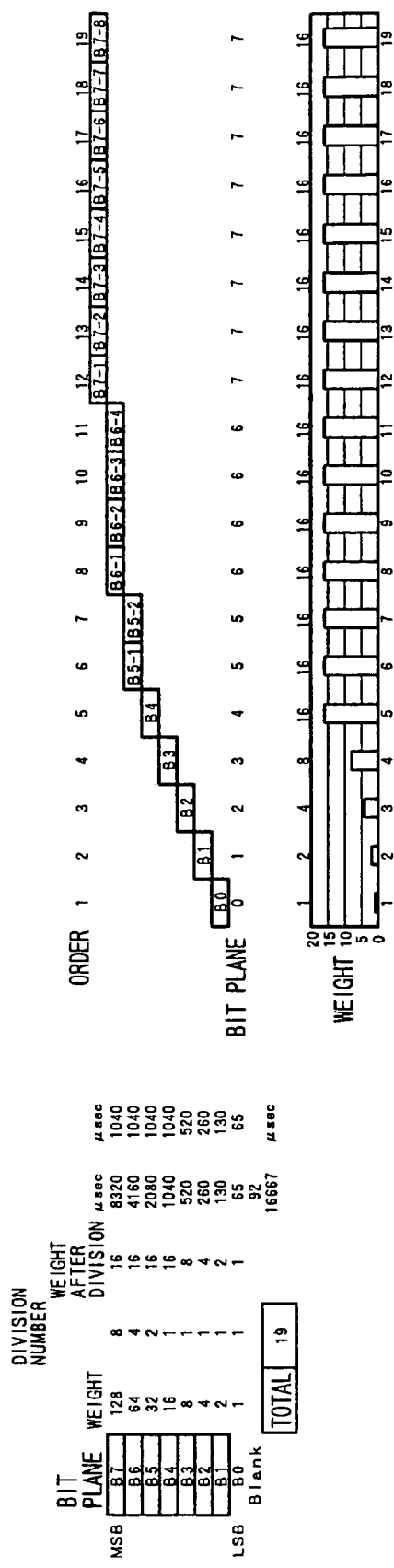

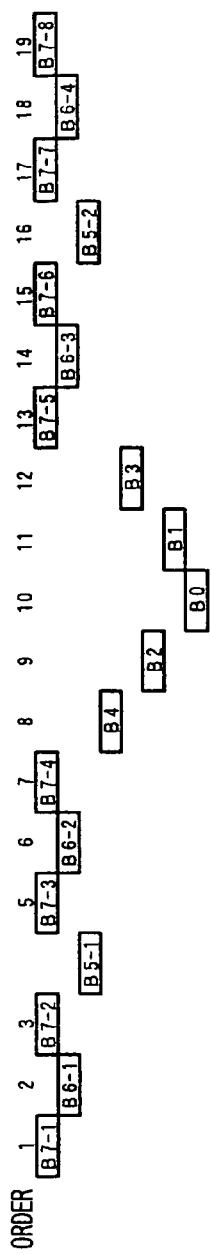

FIG. 23A

| NUMBER OF HORIZONTAL PIXELS | SUBFIELD B7-1 | B6-1 | B7-2 | B5-1 | B7-3 | B6-2 | B7-4 | B4 | B2 | B0 | B1 | B3 | B7-5 | B6-3 | B7-6 | B5-2 | B7-7 | B6-4 | B7-8 |
|---|---|---|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 |
| (OMITTED) | | | | | | | | | | | | | | | | | | | |
| 270 | 0 | 0 | 0 | 0 | 0 | 0 | 0 | 1 | 1 | 0 | 1 | 1 | 0 | 0 | 0 | 0 | 0 | 0 | 0 |
| 271 | 0 | 0 | 0 | 0 | 0 | 0 | 0 | 1 | 1 | 1 | 1 | 1 | 0 | 0 | 0 | 0 | 0 | 0 | 0 |
| 272 | 0 | 0 | 0 | 0 | 0 | 0 | 0 | 1 | 1 | 1 | 1 | 1 | 0 | 0 | 0 | 0 | 0 | 0 | 0 |
| 273 | 0 | 1 | 0 | 0 | 0 | 1 | 0 | 0 | 0 | 0 | 0 | 0 | 1 | 1 | 0 | 0 | 0 | 1 | 1 |
| 274 | 0 | 1 | 0 | 0 | 0 | 1 | 0 | 0 | 0 | 0 | 0 | 0 | 1 | 1 | 0 | 0 | 0 | 1 | 1 |
| (OMITTED) | | | | | | | | | | | | | | | | | | | |
| 502 | 1 | 1 | 1 | 1 | 1 | 1 | 1 | 1 | 0 | 0 | 0 | 0 | 1 | 1 | 1 | 1 | 1 | 1 | 1 |
| 503 | 1 | 1 | 1 | 1 | 1 | 1 | 1 | 1 | 1 | 1 | 1 | 1 | 1 | 1 | 1 | 1 | 1 | 1 | 1 |
| 504 | 1 | 1 | 1 | 1 | 1 | 1 | 1 | 0 | 0 | 0 | 0 | 1 | 1 | 1 | 1 | 1 | 1 | 1 | 1 |
| 505 | 1 | 1 | 1 | 1 | 1 | 1 | 1 | 1 | 1 | 1 | 1 | 1 | 1 | 1 | 1 | 1 | 1 | 1 | 1 |
| 506 | 1 | 1 | 1 | 1 | 1 | 1 | 1 | 0 | 0 | 0 | 0 | 1 | 1 | 1 | 1 | 1 | 1 | 1 | 1 |
| 507 | 1 | 1 | 1 | 1 | 1 | 1 | 1 | 1 | 1 | 1 | 1 | 1 | 1 | 1 | 1 | 1 | 1 | 1 | 1 |
| 508 | 1 | 1 | 1 | 1 | 1 | 1 | 1 | 0 | 0 | 0 | 1 | 1 | 1 | 1 | 1 | 1 | 1 | 1 | 1 |
| 509 | 1 | 1 | 1 | 1 | 1 | 1 | 1 | 1 | 1 | 1 | 1 | 1 | 1 | 1 | 1 | 1 | 1 | 1 | 1 |
| 510 | 1 | 1 | 1 | 1 | 1 | 1 | 1 | 0 | 0 | 1 | 1 | 1 | 1 | 1 | 1 | 1 | 1 | 1 | 1 |
| 511 | 1 | 1 | 1 | 1 | 1 | 1 | 1 | 1 | 1 | 1 | 1 | 1 | 1 | 1 | 1 | 1 | 1 | 1 | 1 |
| 512 | 1 | 1 | 1 | 1 | 1 | 1 | 1 | 1 | 1 | 1 | 1 | 1 | 1 | 1 | 1 | 1 | 1 | 1 | 1 |

FIG. 23B

| LIGHTNESS | NORMALIZED LIGHT AMOUNT | ×100 | LIGHTNESS Lab | COLOR DIFFERENCE ΔE |
|---|---|---|---|---|
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 62.0 | 0.2431 | 24.31 | 56.40 | 0.00 |
| 63.0 | 0.2471 | 24.71 | 56.79 | 0.39 |
| 63.0 | 0.2471 | 24.71 | 56.79 | 0.00 |
| 64.0 | 0.2510 | 25.10 | 57.17 | 0.38 |
| 64.0 | 0.2510 | 25.10 | 57.17 | 0.00 |
| 244.0 | 0.9569 | 95.69 | 98.31 | 0.00 |
| 246.0 | 0.9647 | 96.47 | 98.62 | 0.31 |
| 246.0 | 0.9647 | 96.47 | 98.62 | 0.00 |
| 248.0 | 0.9725 | 97.25 | 98.93 | 0.31 |
| 248.0 | 0.9725 | 97.25 | 98.93 | 0.00 |
| 251.0 | 0.9843 | 98.43 | 99.39 | 0.46 |
| 251.0 | 0.9843 | 98.43 | 99.39 | 0.00 |
| 253.0 | 0.9922 | 99.22 | 99.70 | 0.31 |
| 253.0 | 0.9922 | 99.22 | 99.70 | 0.00 |
| 255.0 | 1.0000 | 100.00 | 100.00 | 0.30 |
| 255.0 | 1.0000 | 100.00 | 100.00 | 0.00 |

FIG. 24A

| MOVEMENT PIXEL NUMBER | 1 | 2 | 2 | 3 | 3 | 4 | 4 | 5 | 5 | 6 | 6 | 7 | 7 | 8 | 8 | 9 | 9 | 10 |
|---|---|---|---|---|---|---|---|---|---|---|---|---|---|---|---|---|---|---|
| SUBFIELD | B7-1 | B6-1 | B7-2 | B5-1 | B7-3 | B6-2 | B7-4 | B4 | B2 | B0 | B1 | B3 | B7-5 | B6-3 | B7-6 | B5-2 | B7-7 | B6-4 | B7-8 |
| NUMBER OF COLUMNS OF HORIZONTAL PIXELS | | | | | | | | | | | | | | | | | | |
| 1 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | | | |
| 7 | 0 | 0 | 0 | 0 | 0 | 0 | 0 | 0 | 0 | 0 | 0 | 0 | 0 | | | | | |
| 8 | 0 | 0 | 0 | 0 | 0 | 0 | 0 | 0 | 0 | 0 | 0 | | | | | | | |
| 9 | 0 | 0 | 0 | 0 | 0 | 0 | 0 | 0 | 0 | | | | | | | | | |
| 10 | 0 | 0 | 0 | 0 | 0 | 0 | 0 | | | | | | | | | | | |
| (OMITTED) | | | | | | | | | | | | | | | | | | |
| 270 | 0 | 0 | 0 | 0 | 0 | 0 | 0 | 0 | 0 | 0 | 0 | 0 | 0 | 0 | 0 | 0 | 0 | |
| 271 | 0 | 0 | 0 | 0 | 0 | 0 | 0 | 0 | 0 | 0 | 0 | 0 | 0 | 0 | 0 | 0 | | |
| 272 | 0 | 0 | 0 | 0 | 0 | 0 | 0 | 0 | 0 | 0 | 0 | 0 | 0 | 0 | 0 | | | |
| 273 | 0 | 0 | 0 | 0 | 0 | 0 | 0 | 0 | 0 | 0 | 0 | 0 | 0 | 0 | | | | |
| 274 | 0 | 0 | 0 | 0 | 0 | 0 | 0 | 0 | 0 | 0 | 0 | 0 | 0 | | | | | |
| (OMITTED) | | | | | | | | | | | | | | | | | | |
| 512 | 1 | 1 | 1 | 1 | 1 | 1 | 1 | 1 | 0 | 0 | 0 | 1 | 1 | 1 | 1 | 1 | 1 | 1 |
| 513 | 1 | 1 | 1 | 1 | 1 | 1 | 1 | 1 | 1 | 0 | 1 | 1 | 1 | 1 | 1 | 1 | 1 | 1 |
| 514 | 1 | 1 | 1 | 1 | 1 | 1 | 1 | 1 | 1 | 1 | 0 | 1 | 1 | 1 | 1 | 1 | 1 | 1 |
| 515 | 1 | 1 | 1 | 1 | 1 | 1 | 1 | 1 | 1 | 1 | 1 | 0 | 1 | 1 | 1 | 1 | 1 | 1 |
| 516 | 1 | 1 | 1 | 1 | 1 | 1 | 1 | 1 | 1 | 1 | 1 | 1 | 1 | 1 | 1 | 1 | 1 | 1 |
| 517 | 1 | 1 | 1 | 1 | 1 | 1 | 1 | 1 | 1 | 1 | 1 | 1 | 1 | 1 | 1 | 1 | 1 | 1 |
| 518 | 1 | 1 | 1 | 1 | 1 | 1 | 1 | 1 | 1 | 1 | 1 | 1 | 1 | 1 | 1 | 1 | 1 | 1 |
| 519 | 1 | 1 | 1 | 1 | 1 | 1 | 1 | 1 | 1 | 1 | 1 | 1 | 1 | 1 | 1 | 1 | 1 | 1 |
| 520 | 1 | 1 | 1 | 1 | 1 | 1 | 1 | 1 | 1 | 1 | 1 | 1 | 1 | 1 | 1 | 1 | 1 | 1 |
| 521 | 1 | 1 | 1 | 1 | 1 | 1 | 1 | 1 | 1 | 1 | 1 | 1 | 1 | 1 | 1 | 1 | 1 | 1 |
| 522 | 1 | 1 | 1 | 1 | 1 | 1 | 1 | 1 | 1 | 1 | 1 | 1 | 1 | 1 | 1 | 1 | 1 | 1 |

FIG. 24B

| LIGHTNESS | NORMALIZED LIGHT AMOUNT | ×100 | LIGHTNESS Lab | COLOR DIFFERENCE ΔE |
|---|---|---|---|---|
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 0.0 | 0.0000 | 0.00 | 0.00 | 0.00 |
| 62.0 | 0.2431 | 24.31 | 56.40 | 1.19 |
| 60.0 | 0.2353 | 23.53 | 55.61 | -0.79 |
| 61.0 | 0.2392 | 23.92 | 56.01 | 0.40 |
| 61.0 | 0.2392 | 23.92 | 56.01 | 0.00 |
| 76.0 | 0.2980 | 29.80 | 61.48 | 5.48 |
| 249.0 | 0.9765 | 97.65 | 99.08 | 0.15 |
| 251.0 | 0.9843 | 98.43 | 99.39 | 0.31 |
| 223.0 | 0.8742 | 87.45 | 94.93 | -4.46 |
| 189.0 | 0.7412 | 74.12 | 88.98 | -5.95 |
| 157.0 | 0.6157 | 61.57 | 82.68 | -6.29 |
| 127.0 | 0.4980 | 49.80 | 75.95 | -6.73 |
| 122.0 | 0.4784 | 47.84 | 74.73 | -1.22 |
| 112.0 | 0.4392 | 43.92 | 72.18 | -2.55 |
| 80.0 | 0.3137 | 31.37 | 62.82 | -9.36 |
| 48.0 | 0.1882 | 18.82 | 50.48 | -12.34 |
| 16.0 | 0.0627 | 6.27 | 30.09 | -20.39 |

F I G. 25A
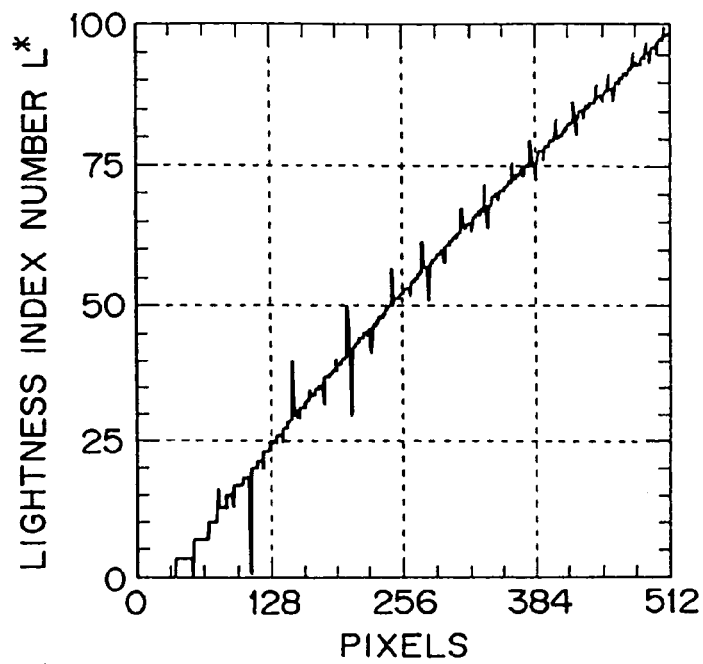
F I G. 25B
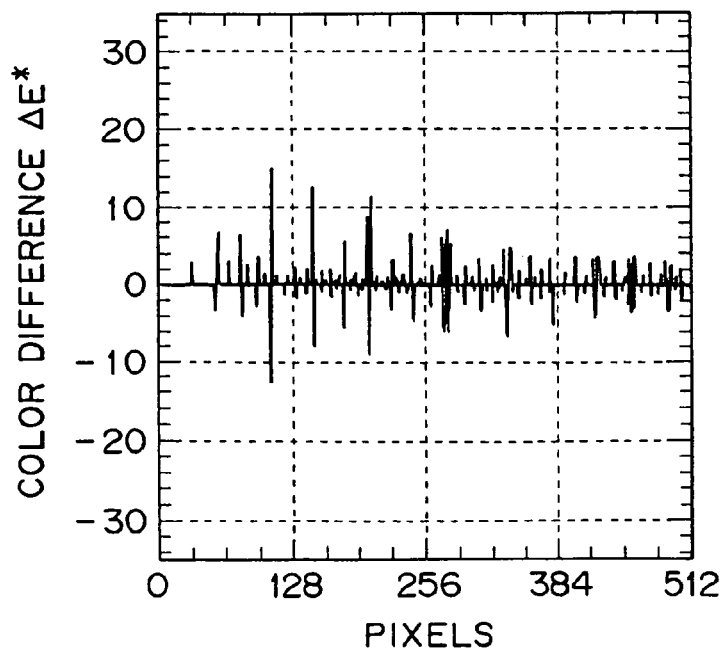

F I G. 27A
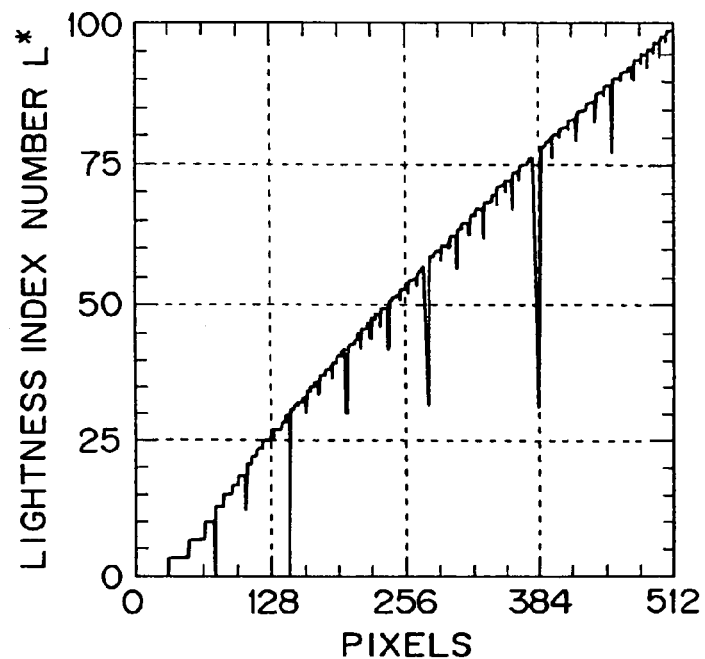
F I G. 27B
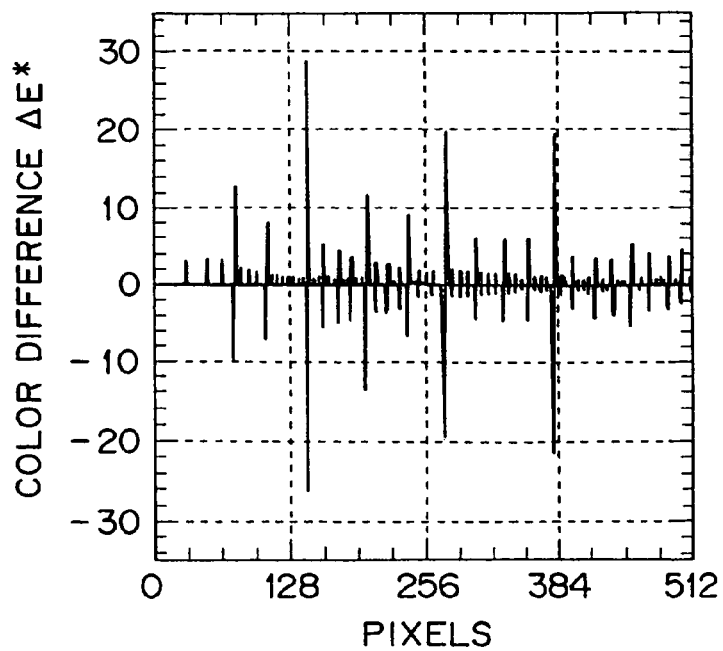

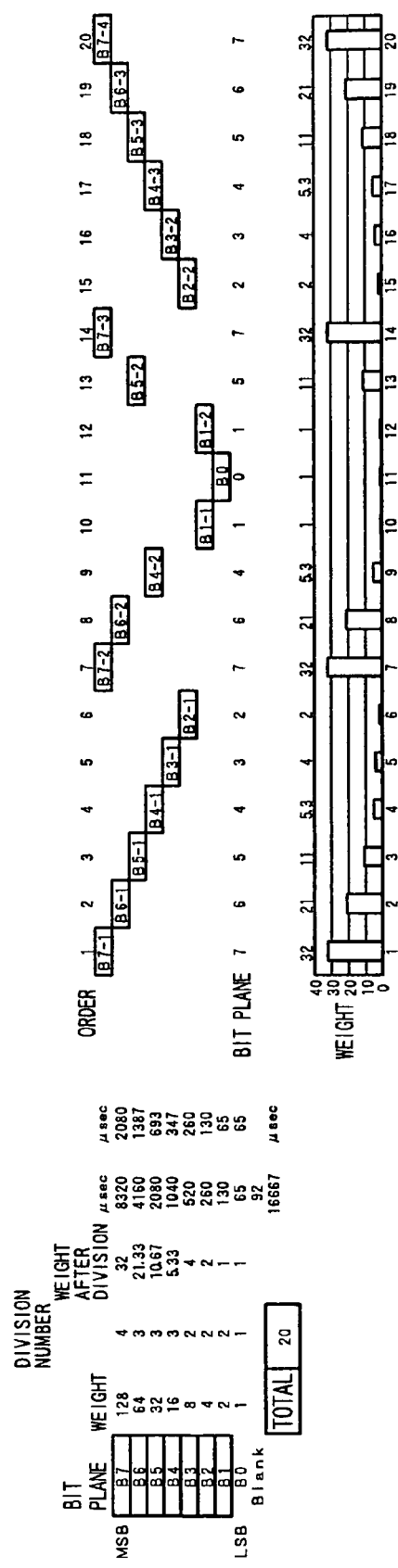

F I G. 31A
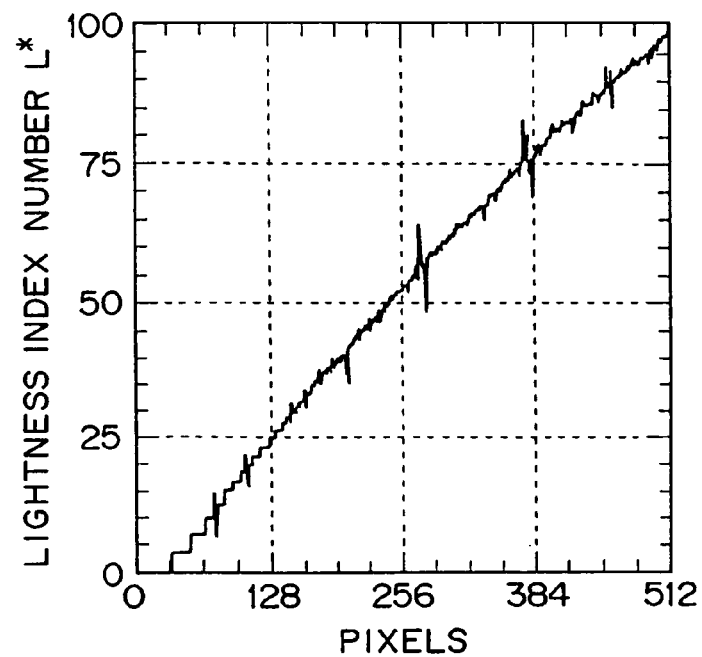
F I G. 31B
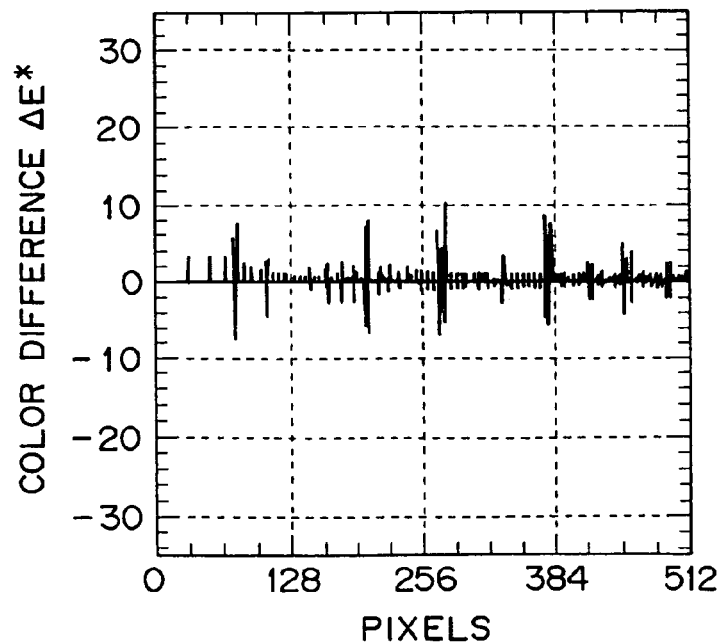

F I G. 33A
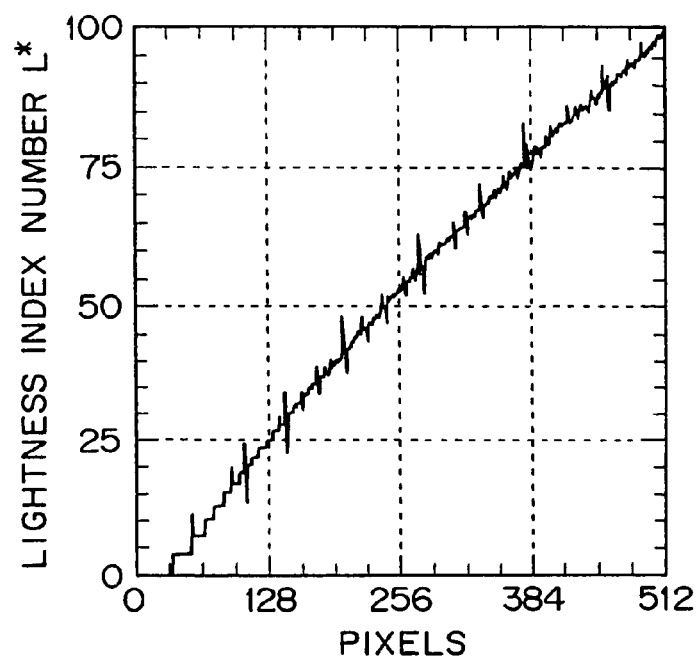
F I G. 33B
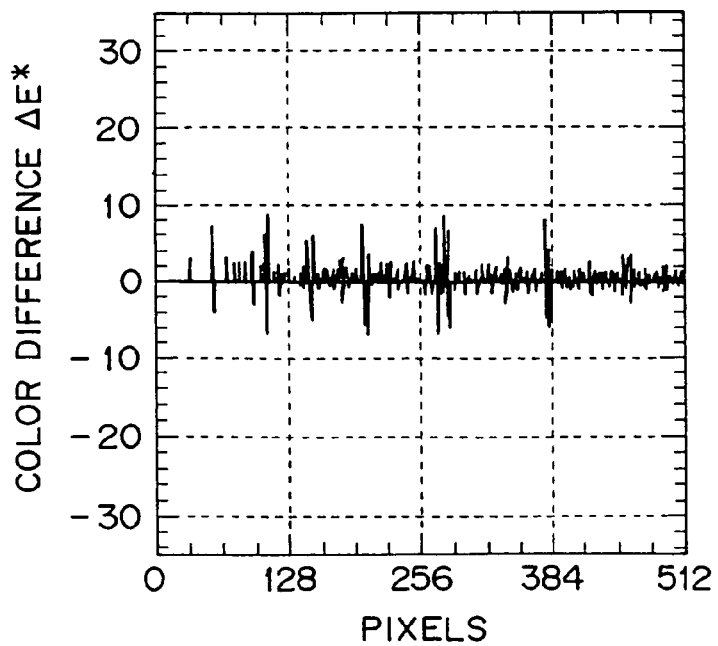

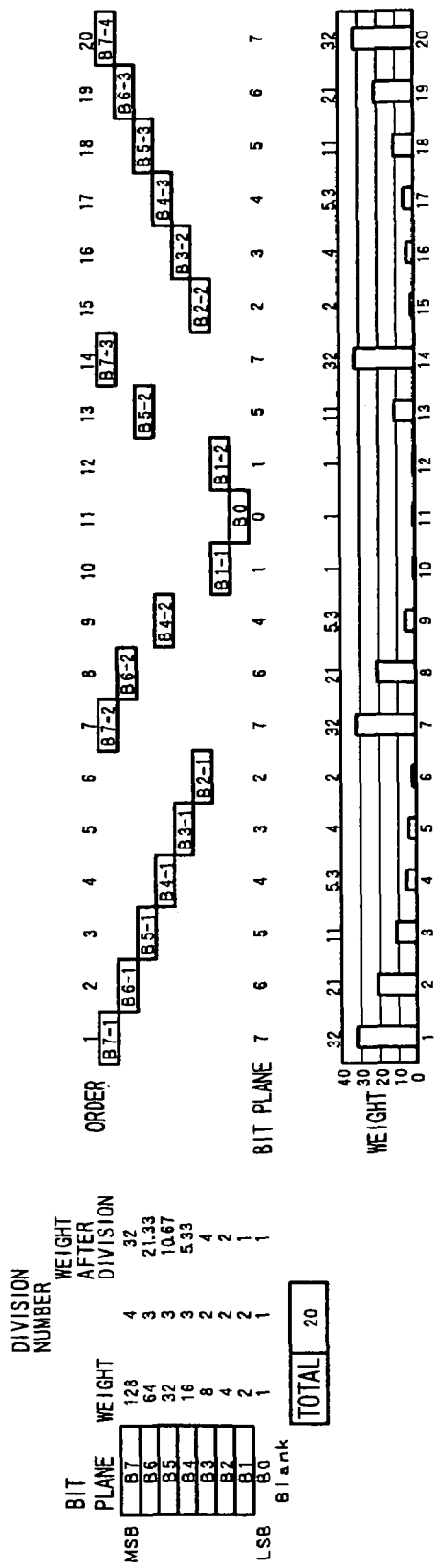

DISPLAY CONTROL APPARATUS AND DISPLAY CONTROL METHOD

BACKGROUND OF THE INVENTION

This invention relates to a display control apparatus and a display control method, and more particularly to a display control apparatus and a display control method by which, when digital gradation display is performed, appearances of a moving picture pseudo contour can be reduced simply.

Conventional image display apparatus commonly adopt an analog gradation display system of displaying each pixel in an analog gradation. In recent years, however, also an image display apparatus which adopts a digital gradation display system based on PWM (Pulse Width Modulation) has been realized.

Image display apparatus which adopt the digital gradation display system include, for example, a PDP (Plasma Display Panel), a display unit which uses a light valve which is a display element for switching (transmitting/intercepting) light from a light source on/off, and so forth. As the light valve, for example, a liquid crystal panel which uses FLC (Ferroelectric Liquid Crystal), a DMD (Digital Micromirror Device (DMD is a trademark of TEXAS INSTRUMENTS) and so forth are used.

In a display apparatus which uses a light valve, light emitted from a light source of a fixed luminance (intensity) such as, for example, a metal halide lamp, a xenon lamp or a high pressure mercury vapor lamp is irradiated upon the light valve while the times within which pixels of the light valve are switched on/off are controlled to realize digital gradation display. In particular, a pixel for which the time within which the light valve is on is long (a pixel for which the time within which the light valve is off is short) is bright, but on the contrary a pixel for which the time within which the light valve is on is short (a pixel for which the time within which the light valve is off is long) is dark. A digital gradation display is realized thereby.

As a method of realizing a digital gradation display, for example, a plane sequential rewriting method is available.

In a digital gradation display by the plane sequential rewriting method, as shown in FIG. 1, digital values representative of pixel values of pixels which form an image of one frame (or one field) are sliced for individual bits so that they are converted into bit planes, and are stored for the individual bit planes into a memory. In FIG. 1, eight bits are allocated to each pixel value, and eight bit planes are obtained. In the following description, unless otherwise specified, eight bits are allocated to each pixel value, and the lowest order bit (least significant bit) of such a pixel value is represented by B0, the second bit from the lowest order bit by B1, . . . , and the highest order bit (most significant bit) by B7. The bit plane of the bit B#i (i= 0, 1, . . . , 7) is represented as bit plane B#i.

After the bit planes are stored into the memory, the pixel at each position is switched on or off time-divisionally for times corresponding to weights of the bit planes in response to the bits of the bit planes at the position.

For example, if the weight of the bit plane B0 is 1, then the weight of the bit plane B2 is 2, and the weight of the bit plane B3 is 4. Similarly, the weight of the bit plane B#i is $2^{i-1}$. Accordingly, a pixel at a certain position is controlled to on or off for a time T in accordance with the bit of the bit plane B0, and then controlled to on or off for another time 2T in accordance with the bit of the bit plane B1. Further, similarly the pixel is successively controlled to on or off for a time 4T in accordance with the bit of the bit plane B2, to on or off for a time 8T in accordance with the bit of the bit plane B3, to on or off for a time 16T in accordance with the bit of the bit plane B4, to on or off for a time 32T in accordance with the bit of the bit plane B5, to on or off for a time 64T in accordance with the bit of the bit plane B6, and to on or off for a time 128T in accordance with the bit of the bit plane B7. It is to be noted that T+2T+4T+8T+16T+32T+64T+128T is set so that it may be equal to or shorter than the time of one frame.

When digital gradation display according to the plane sequential rewriting method is to be performed, in order to represent some gradations, it is necessary to use a certain number of bit planes after all. However, in the digital gradation display, from the foregoing, a time corresponding to the weight of each bit plane is allocated time-divisionally to the bit plane within the time of one frame, and a pixel is controlled to on or off within the allocated time (hereinafter referred to as subfield). Accordingly, the timing at which a pixel is controlled to on or off is displaced among the different bit planes, and therefore, when a moving picture is displayed, a moving picture pseudo contour appears and deteriorates the picture quality.

Thus, a method is available wherein the subfields of the bit planes are set to shorter times and are packed toward the top of the time of one frame to reduce the displacements of timings at which the pixels are controlled to on/off for the individual bit planes to reduce appearances of a moving picture pseudo contour. According to the method, however, since the time within which a pixel is on within the entire time of one frame is reduced, this gives rise to reduction of the light amount, i.e., to reduction of the light utilization efficiency.

For example, U.S. Pat. No. 5,969,710 discloses a method wherein a subfield is divided into short time units shorter than 1/16 the time of one frame and the short time units (also such a short time unit is hereinafter referred to suitably as subfield) are disposed in a distributed manner within one frame time to reduce the displacements of the timings at which the pixels are controlled to on/off for the individual bit planes to reduce appearances of a moving picture pseudo contour. It is to be noted that, in U.S. Pat. No. 5,969,710, a DMD mentioned hereinabove is used as a light valve.

However, where a subfield is divided into short time units shorter than 1/16 the time of one frame and a pixel is controlled to on/off in the short time units, since the number of times by which a pixel is controlled to on/off within one frame time increases. Besides, since a pixel must be controlled to on/off in the short time, a light valve, a light source or the like which allows high-speed on/off switching is required. As a result, the light valve, light source or the like which can be used for the apparatus is limited.

On the other hand, where the number of bit planes is reduced, in order to reduce appearances of a moving picture pseudo contour, it is necessary to use pixel diffusion by dithering or the like or a correction pulse to perform processing of reducing noise. Accordingly, driving of the light valve or the light source is complicated. Further, a circuit which performs the processing of reducing noise must be provided, and this increases the cost of the apparatus. Further, the noise reduction process which uses pixel diffusion by dithering or a correction pulse in most cases effective for an image of a particular pattern, and accordingly, noise sometimes becomes striking conversely with images other than an image of the particular pattern.

SUMMARY OF THE INVENTION

It is an object of the present invention to provide a display control apparatus and a display control method wherein, where digital gradation display is performed, appearances of a moving picture pseudo contour can be reduced simply.

In order to attain the object described above, according to the present invention, there is provided a display control apparatus for controlling a display apparatus which displays an image in digital gradation, comprising inputting means for inputting digital values corresponding to pixel values which compose the image, and signal production means for producing a signal for driving the display apparatus so that light of divisional light amounts obtained by dividing light amounts corresponding to bits which compose the digital values may be emitted in a such manner as to be distributed within a time corresponding to one screen. Where both of a first light amount corresponding to a predetermined bit and a second light amount corresponding to a bit in a lower order by one bit to the bit are divided, the first and second light amounts are divided so that the division number of the first light amount may be smaller than twice the division number of the second light amount.

According to another aspect of the present invention, there is provided a display control method for controlling a display apparatus which displays an image in digital gradation, comprising an inputting step of receiving digital values corresponding to pixel values which compose the image, and a signal production step of producing a signal for driving the display apparatus so that light of divisional light amounts obtained by dividing light amounts corresponding to bits which compose the digital values may be emitted in such a manner as to be distributed within a time corresponding to one screen. Where both of a first light amount corresponding to a predetermined bit and a second light amount corresponding to a bit in a lower order by one bit to the bit are divided, the first and second light amounts are divided so that the division number of the first light amount may be smaller than twice the division number of the second light amount.

In the display control apparatus and the display control method, a signal is produced for driving the display apparatus so that light of divisional light amounts obtained by dividing light amounts corresponding to bits which compose digital values may be emitted in such a manner as to be distributed within a time corresponding to one screen. In this instance, where both of a first light amount corresponding to a predetermined bit and a second light amount corresponding to a bit in a lower order by one bit to the bit are divided, the first and second light amounts are divided so that the division number of the first light amount may be smaller than twice the division number of the second light amount. Accordingly, where digital gradation display is performed, occurrences of a moving picture pseudo contour can be reduced simply.

BRIEF DESCRIPTION OF THE DRAWINGS

FIG. 4 is a perspective view showing a display apparatus according to a third embodiment of the present invention;

FIG. 5 is a block diagram showing an electric configuration of a display apparatus to which the present invention is applied;

FIG. 6 is a flow chart illustrating processing of the display apparatus of the present invention;

FIGS. 9A and 9B are similar views but illustrating relationships of a luminance and a lightness index number multiplied by a gamma value to a gradation, respectively;

FIGS. 12A and 12B are diagrams illustrating a digital gradation display by intensity modulation;

FIGS. 15A to 14D are tables illustrating bits of bit planes obtained from the evaluation image;

FIGS. 16A to 16C are diagrammatic views illustrating a manner wherein light amounts are divided in the direction of time and distributed discretely;

FIGS. 18A and 18B are diagrammatic views illustrating light amounts of pixels when the evaluation image moves;

FIGS. 19A and 19B are diagrams illustrating different relationships of a luminance and a lightness index number to a gradation, respectively;

FIGS. 20A and 20B are diagrammatic views illustrating another light emission pattern of a pixel;

FIGS. 22A and 22B are diagrammatic views illustrating a further light emission pattern of a pixel;

FIGS. 23A and 23B are tables illustrating light amounts of pixels when the evaluation image is in a stopping state;

FIGS. 24A and 24B are tables illustrating light amounts of pixels when the evaluation image moves;

FIGS. 25A and 25B are diagrams illustrating still further relationships of a luminance and a lightness index number to a gradation, respectively;

FIGS. 27A and 27B are diagrams illustrating yet further relationships of a luminance and a lightness index number to a gradation, respectively;

FIGS. 30A and 30B are diagrammatic views illustrating a yet further light emission pattern of a pixel;

FIGS. 31A and 31B are diagrams illustrating yet further relationships of a luminance and a lightness index number to a gradation, respectively;

FIGS. 33A and 33B are diagrams illustrating yet further relationships of a luminance and a lightness index number to a gradation, respectively;

FIGS. 34A and 34B are diagrammatic views illustrating a yet further light emission pattern of a pixel.

DESCRIPTION OF THE PREFERRED EMBODIMENTS

First Embodiment

Figure 2:
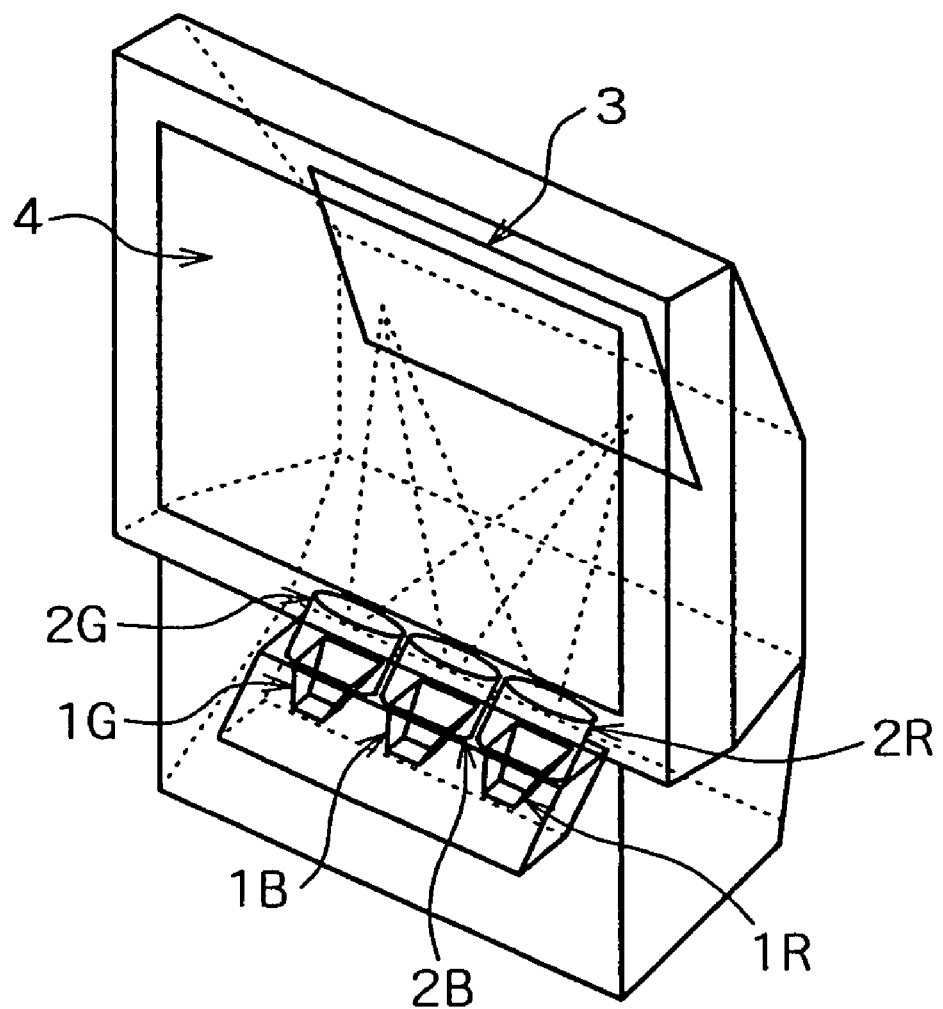
FIG. 2 is a perspective view showing a display apparatus according to a first embodiment of the present invention.

FIG. 2 shows an example of appearance configuration of a display apparatus according to a first embodiment of the present invention.

The present display apparatus is a projector which uses a CRT (Cathode Ray Tube), and an R CRT 1R, a G CRT 1G and a B CRT 1B emit light of components (color components) of R (Red), G (Green) and B (Blue) of an image, respectively. The light of the R component, the light of the G component and the light of the B component pass through an R projection lens 2R, a G projection lens 2G and a B projection lens 2B, respectively, and are irradiated upon a reflecting mirror 3. The light of the R component, the light of the G component and the light of the B component irradiated upon the reflecting mirror 3 are reflected by the reflecting mirror 3 and irradiated upon a transmission screen 4. Consequently, an image formed from the R, G and B components is displayed on the transmission screen 4.

Second Embodiment

Figure 3:
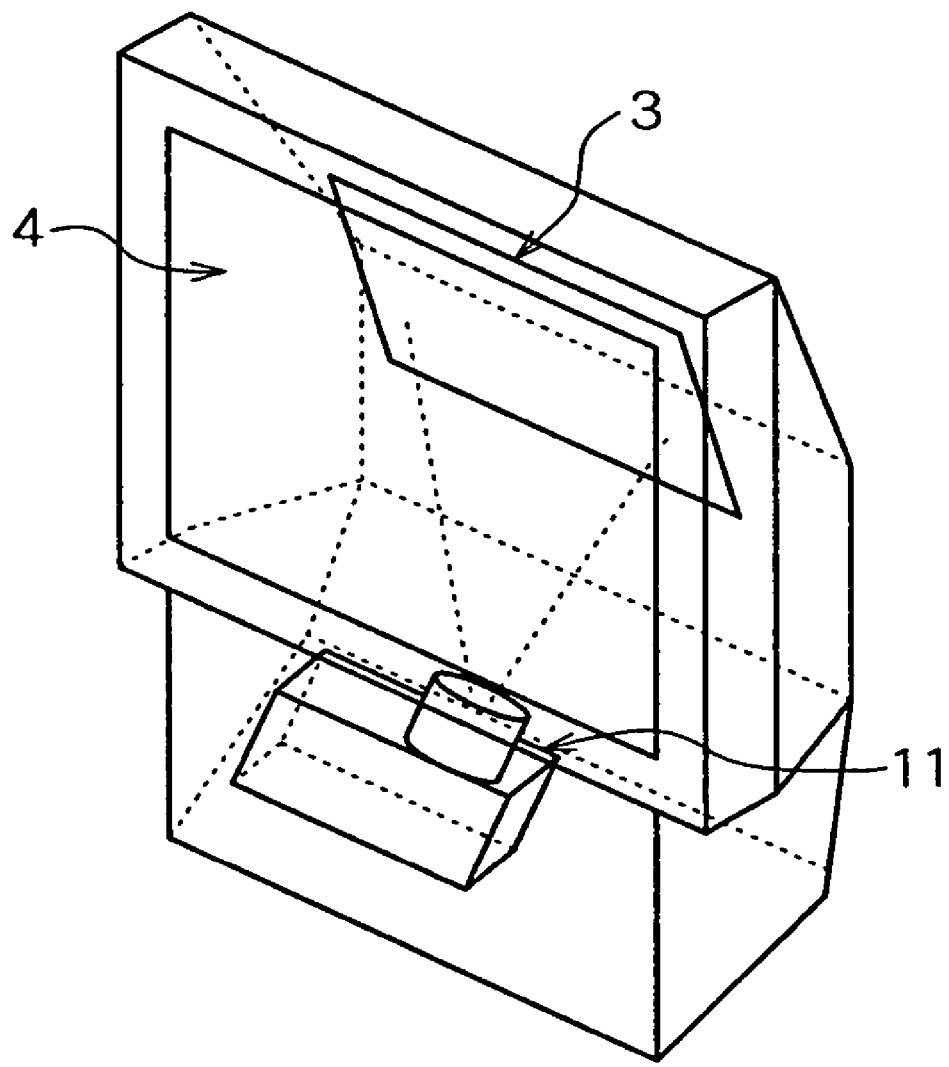
FIG. 3 is a perspective view showing a display apparatus according to a second embodiment of the present invention.

FIG. 3 shows an example of appearance configuration of a display apparatus according to a second embodiment of the present invention. Referring to FIG. 3, the display apparatus is configured in a similar manner to that in FIG. 2 except that a liquid crystal projector 11 is provided in place of the R CRT 1R, G CRT 1G and B CRT 1B as well as the R projection lens 2R, G projection lens 2G and B projection lens 2B.

The liquid crystal projector 11 is formed from a liquid crystal panel, a lens and so forth not shown, and enlarges an image displayed on the liquid crystal panel by means of the lens and irradiates corresponding light upon the reflecting mirror 3. An image of the light reflected from the reflecting mirror 3 is displayed on the transmission screen 4.

Third Embodiment

FIG. 4 shows an example of appearance configuration of a display apparatus according to a third embodiment of the present invention.

The present display apparatus is an HMD (Head Mounted Display) apparatus, and a user uses the display apparatus with a head mounting section 23 mounted on the head thereof such that a lens 22 may be opposed to the pupils of the user itself.

In this instance, light as an image displayed on an image display panel 21 formed from a CRT, a liquid crystal panel or the like of a small size is introduced into the pupils of the user through the lens 22. Thereupon, a virtual image of a predetermined size is observed at a position spaced by a predetermined distance by the pupils of the user.

The present invention can be applied also to a PDP or a display apparatus which uses an LED (Light Emitting Diode) as a pixel.

FIG. 5 shows an example of electric configuration of a display apparatus to which the present invention is applied.

Digital image data outputted, for example, from a personal computer 30 are supplied to the display apparatus. It is to be noted that, in the display apparatus of FIG. 5, the personal computer 30 outputs, for example, digital image data wherein each pixel value includes components of R, G and B. Further, for example, eight bits are allocated to each of the components of R, G and B.

The digital image data supplied to the display apparatus are inputted to an input interface (I/F) 31. The input interface 31 receives the digital image data supplied thereto and supplies them to a gamma circuit 32. The gamma circuit 32 multiplies the digital image data from the input interface 31 by a predetermined gamma value if necessary and supplies resulting image data to a bit plane production circuit 33. The bit plane production circuit 33 produces such bit planes as described hereinabove with reference to FIG. 4 for each frame from the digital image data from the gamma circuit 32 and supplies the bit planes to a frame memory 34. The frame memory 34 temporarily stores the bit planes supplied thereto from the bit plane production circuit 33. A signal production circuit 35 produces a drive signal for driving a display section 36 in accordance with the bit planes stored in the frame memory 34. In particular, the signal production circuit 35 produces a drive signal for performing digital gradation display by the plane sequential rewriting method, and supplies the drive signal to the display section 36. The display section 36 displays an image in accordance with the drive signal from the signal production circuit 35.

The display section 36 can be formed from, for example, a light source for emitting light of a fixed intensity and a light valve. As the light source for emitting light of fixed intensity, for example, such a xenon lamp, a metal halide lamp or the like mentioned hereinabove can be used, and also it is possible to use a laser light source, an LED or the like. In this instance, the signal production circuit 35 produces a drive signal for causing the display section 36 to emit pulse width modulated light by controlling the light valve to on/off.

As an alternative, the display section 36 can be formed from, for example, a light source which emits light of fixed intensity without using a light valve. Where, for example, an LED is used as the light source which emits light of fixed intensity, LEDs individually corresponding to pixels can be provided. In this instance, the signal production circuit 35 produces a drive signal for causing the display section 36 to emit pulse width modulated light by controlling the LEDs corresponding to the individual pixels to on/off.

As another alternative, the display section 36 can be formed from, for example, a light source which emits light of variable intensity. As the light source for emitting light of variable intensity, for example, a laser light source, an LED or the like can be used. Where, for example, an LED is used as the light source and LEDs individually corresponding to pixels are provided, the signal production circuit 35 produces a drive signal for causing the display section 36 to emit intensity modulated light by controlling the light intensities of the LEDs corresponding to the individual pixels.

As a further alternative, the display section 36 can be formed from, for example, a light source which emits light of variable intensity and a light valve. In this instance, the signal production circuit 35 produces a drive signal for causing the display section 36 to emit intensity modulated light by controlling the light source and the light valve.

It is to be noted that it is otherwise possible for the signal production circuit 35 to produce a drive signal for causing the display section 36 to emit pulse width modulated light for a certain bit plane or planes and emit intensity modulated light for the other bit plane or planes.

Now, a display process of an image by the display apparatus of FIG. 5 is described with reference to a flow chart of FIG. 6.

Digital image data outputted from the personal computer 30 are received by the input interface 31 and supplied to the gamma circuit 32. The gamma circuit 32 multiplies the digital image data by a predetermined gamma value if necessary and supplies resulting digital image data to the bit plane production circuit 33 in step S1. The bit plane production circuit 33 produces bit planes for the different bits from the digital image data from the gamma circuit 32 and supplies and stores the bit planes to and into the frame memory 34. Then, the processing advances to step S3, in which the signal production circuit 35 produces, based on the bit planes stored in the frame memory 34, a drive signal for causing the display section 36 to emit pulse width modulated or intensity modulated light and supplies the drive signal to the display section 36, and then the processing advances to step S4. In step S4, the display section 36 is driven in accordance with the drive signal from the signal production circuit 35 to display a corresponding image, and then the processing is ended.

It is to be noted that the processing illustrated in FIG. 6 is a process for displaying an image of one frame (or one field) and accordingly is performed for the individual frames.

Figure 7A:
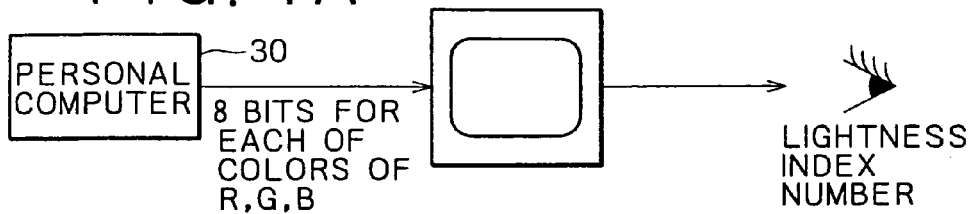
FIGS. 7A to 7H are diagrammatic views illustrating an analog gradation display and a digital gradation display.
Figure 7B:

Now, a relationship between the digital image data supplied to the display apparatus of FIG. 5 and an image displayed on the display section 36 is described.

Where the digital image data are formed from R, G and B components of 8 bits as described hereinabove, 256 (=$2^8$) gradations can be represented for each component (each color), and accordingly, 16,777,216 colors (=256×256×256) can be represented with the three components of R, G and B.

Where such digital image data are displayed in accordance with an analog gradation display system on a CRT, for example, as shown in FIG. 7A, the digital image data as an input signal and the luminance of an image displayed on the CRT do not increase in proportion to each other but have such a relationship as illustrated in FIG. 7B and an intermediate gradation portion is displayed darker than the brightness with which it should originally be displayed.

Meanwhile, as an index number representative of the brightness which a human being feels with the sense of sight with regard to a certain luminance value y, for example, a lightness index number is available, and according to a displaying method of an object color according to the L*a*b* display system in JIS Z 8729, the lightness index number L* can be represented by the following expression:

$L^* = 116(y/Y)^{1/3} - 16$ (where $y/Y > 0.008856$)

$L^* = 903.29(y/y)$ (where $y/Y \leq 0.008856$)  (1)

where Y represents the highest luminance value (intensity).

Figure 7C:
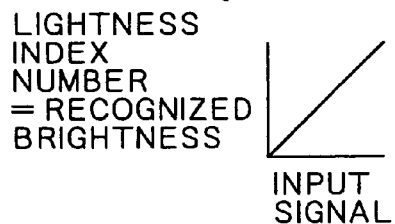

According to the expression (1), the lightness index number L* is a value obtained by gamma correcting the luminance value y. Accordingly, although digital image data as an input signal and the luminance of an image displayed on a CRT do not increase in proportion to each other as described above, the digital image data and the lightness index number L* as a brightness which a human being who observes a corresponding image feels increase substantially in proportion to each other as illustrated in FIG. 7C.

Figure 7D:
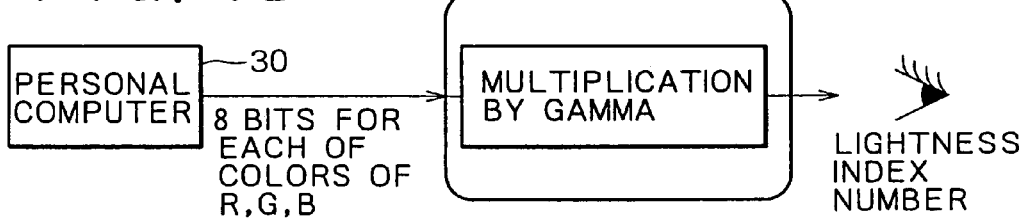
Figure 7F:
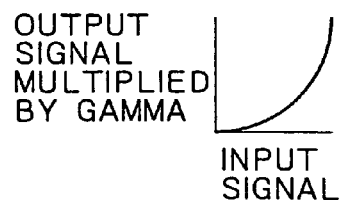
Figure 7E:
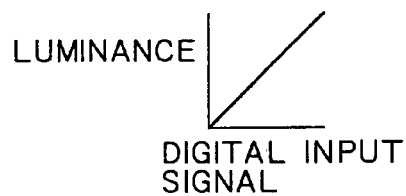

In contrast, where digital image data are displayed, for example, by a display apparatus of a digital gradation display system such as a PDP as illustrated in FIG. 7D, the digital image data as an input signal and the luminance of an image displayed on the display apparatus increase substantially in proportion to each other as illustrated in FIG. 7E.

In this instance, however, since the lightness index number L* is such a value as is obtained by so-called gamma correcting the luminance value y, a human being feels an intermediate gradation portion brighter than the original brightness value of it.

Figure 7G:

Thus, in the display apparatus of FIG. 5, the gamma circuit 32 multiplies digital image data by a gamma value. Where the digital image data as an input signal are multiplied by a gamma value, resulting digital image data and the luminance value of an image displayed on the display apparatus have such a relationship as shown in FIG. 7F, and where the resulting image data are displayed on the display apparatus which has such a characteristic as illustrated in FIG. 7E, the relationship between the digital image data as an input signal and the luminance of the image displayed on the display apparatus becomes such as illustrated in FIG. 7G, which is similar to that of FIG. 7B.

Figure 7H:
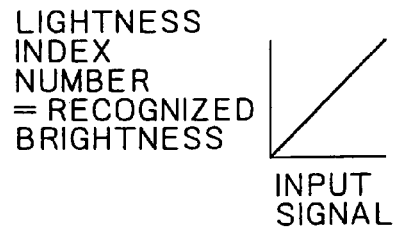

Accordingly, the digital image data and the lightness index number L* as a brightness which a human being who looks at an image corresponding to the digital image data feels have such a relationship as shown in FIG. 7H and increase substantially in proportion to each other similarly as in the case of FIG. 7C.

From the foregoing, by dividing digital image data by a gamma value, also on a display apparatus according to a digital gradation display system, a user can enjoy an image similar to that according to an analog gradation display system.

Figure 8A:
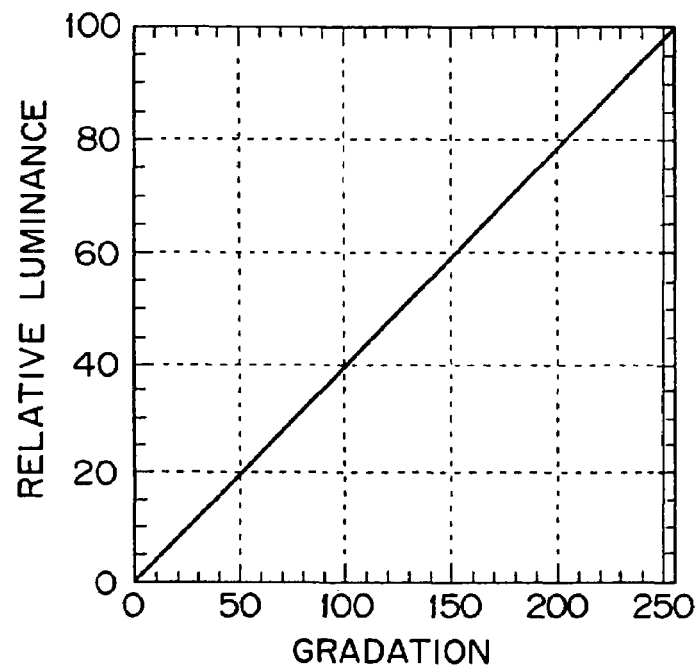
FIGS. 8A and 8B are diagrams illustrating relationships of a luminance and a lightness index number to a gradation, respectively.
Figure 8B:
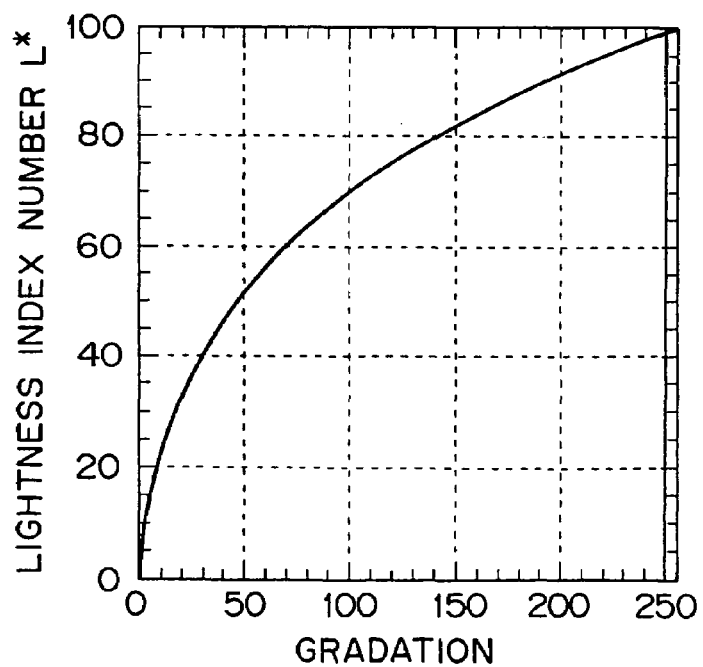

FIGS. 8A and 8B illustrate relationships of the luminance and the lightness index number to the gradation of digital image data.

FIG. 8A illustrates a relationship between the gradation and the luminance, and the two are in a proportional relationship. FIG. 8B illustrates a relationship between the gradation and the lightness index number. From the expression (1) given hereinabove, where the luminance is low, the variation of the lightness index number relative to the variation of the luminance is great. Accordingly, where the gradation and the luminance are in a proportional relationship, the variation of the lightness index number is great when the gradation is low.

It is to be noted that, in FIG. 8A, each luminance y is represented as a relative luminance with reference to the highest luminance value Y where the highest luminance value Y is represented by 100. Further, the luminance y is the luminance of one of the components of R, G and B, that is, the luminance of a single color. Also in the following description, this applies similarly unless otherwise specified.

FIGS. 9A and 9B illustrate relationships of the luminance and the lightness index number multiplied by a gamma value to the gradation, respectively.

In particular, FIG. 9A illustrates a relationship between the gradation and the luminance where digital image data is multiplied by a gamma value of 2.2. FIG. 9B illustrates a relationship between the gradation and the lightness index number where the relationship between the gradation and the luminance is such as illustrated in FIG. 9A. Since the digital image data are multiplied by the gamma value of 2.2, the relationship between the gradation and the lightness index number of FIG. 9B becomes a substantially proportional relationship.

Now, digital gradation display by pulse width modulation is described.

Figure 10A:
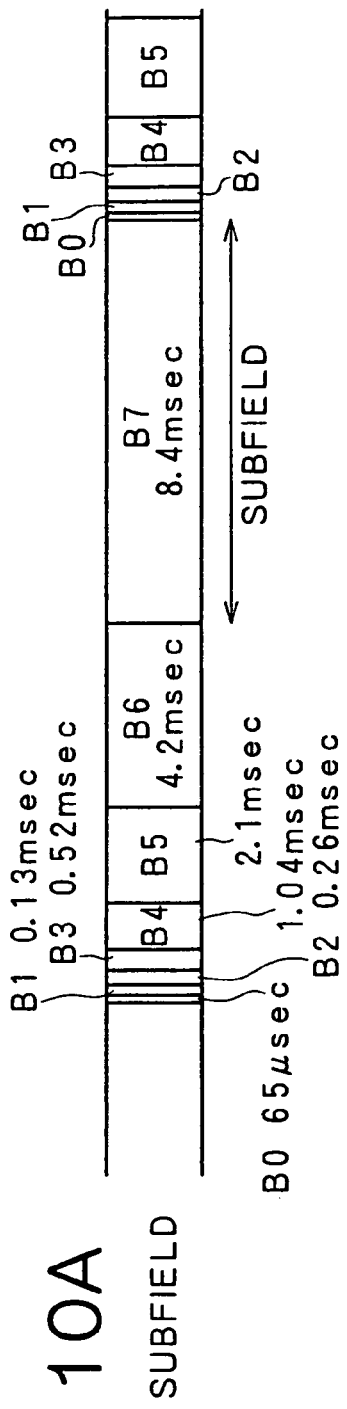
FIGS. 10A to 10C are diagrammatic views illustrating a digital gradation display by pulse width modulation.

In digital gradation display by pulse width modulation, a subfield as a time corresponding to a weight of each bit plane is allocated time-divisionally to the bit plane within the time of one frame as illustrated in FIG. 10A.

For example, if a pixel value is composed of 8 bits, then eight bit planes B0 to B7 are obtained as described above, and to the eight bit planes B0 to B7, the times T, 2T, 4T, 8T, 16T, 32T, 64T and 128T corresponding to the respective weights within the time of one frame are allocated as subfields.

Accordingly, if it is assumed that one frame rate is 60 Hz, then the time of one frame is approximately 16.67 milliseconds, and if the 16.67 milliseconds are all allocated to the subfields, then the subfield of the bit plane B0 is 16.67 milliseconds×1/(1+2+4+8+16+32+64+128), that is, approximately 65 microseconds. Meanwhile, the subfield of the bit plane B1 is 16.67 milliseconds×2/(1+2+4+8+16+32+64+128), that is, approximately 130 microseconds. Further, similarly the subfield of the bit plane B2 is approximately 260 microseconds; the subfield of the bit plane B3 is approximately 0.52 milliseconds; the subfield of the bit plane B4 is approximately 1.04 milliseconds; the subfield of the bit plane B5 is approximately 2.1 milliseconds; the subfield of the bit plane B6 is approximately 4.2 milliseconds; and the subfield of the bit plane B7 is approximately 8.4 milliseconds.

Figure 10B:
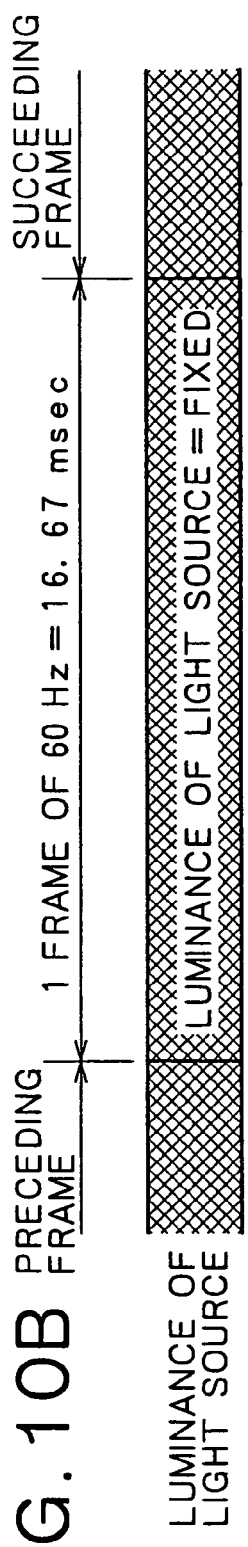

It is to be noted that, in FIG. 10A, the subfields of the bit planes B0 to B7 are successively allocated to the time of one frame from the top of the same.

Where the display section 36 is formed from a light source of fixed intensity and a light valve, light of fixed intensity is irradiated from the light source as illustrated in FIG. 10B. And, each pixel of the light valve is controlled to on/off for periods of the subfields of the bit planes in accordance with the bits of the bit planes to represent a predetermined gradation.

Figure 10C:
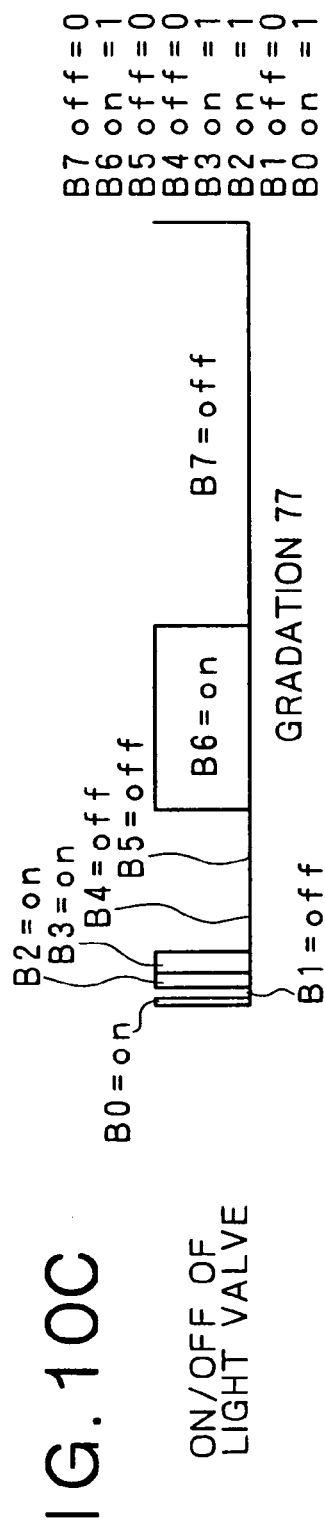

For example, where the gradation is 77, the gradation is represented as 01011101B (B represents that the value is a binary number) in binary number. Now, if it is assumed that the state wherein the bit is 1 or 0 corresponds to on or off, respectively, then the pixel is controlled, as illustrated in FIG. 10C, to on in the subfield of the bit plane B0, to off in the subfield of the bit plane B1, to on in the subfields of the bit planes B2 and B3, to off in the subfields of the bit planes B4 and B5, to on in the subfield of the bit plane B6, and to off in the subfield of the bit plane B7.

When the pixel is in an on state, the light from the light source goes out from the pixel. As a result, light of a light amount (luminance) obtained by time integrating results of multiplication of FIGS. 10B and 10C within the time of one frame is emitted from the pixel.

Where the display section 36 is formed from light sources of fixed intensity corresponding to the individual pixels, a light source corresponding to one of the pixels is controlled to on/off for periods of the subfields of the bit planes to represent a predetermined gradation.

Figure 11A:
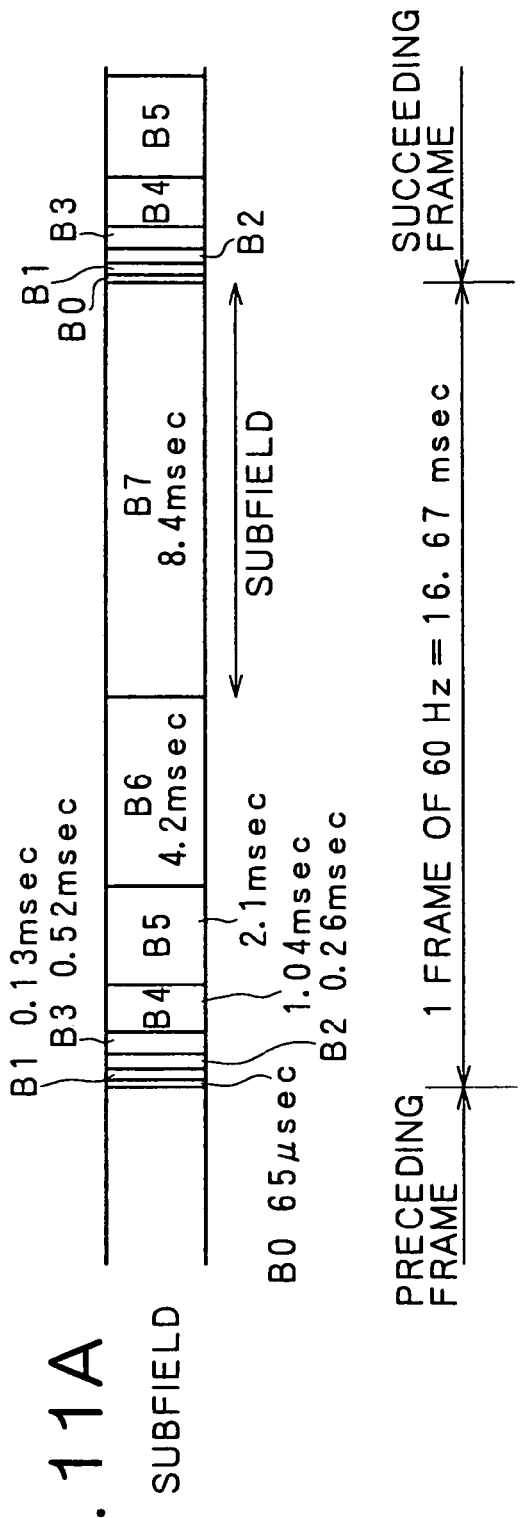
FIGS. 11A and 11B are similar views but illustrating another digital gradation display by pulse width modulation.
Figure 11B:
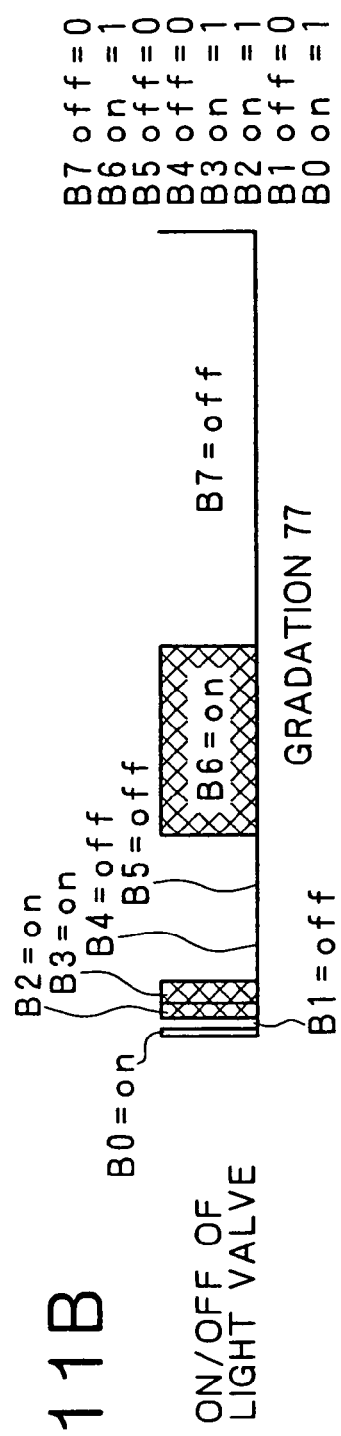

For example, where the gradation is 77, since its binary representation is as 01011101B as given above, the light source as the pixel is controlled, as illustrated in FIG. 11B, to on in the subfield of the bit plane B0, to off in the subfield of the bit plane B1, to on in the subfields of the bit planes B2 and B3, to off in the subfields of the bit planes B4 and B5, to on in the subfield of the bit plane B6, and to off in the subfield of the bit plane B7. As a result, light of a light amount (luminance) obtained by time integrating the light amounts of FIG. 11B within the time of one frame is emitted from the pixel corresponding to the light source.

It is to be noted that FIG. 11A illustrates subframes of time lengths corresponding to weights of the individual bit planes and is similar to FIG. 10A.

Now, digital gradation display by intensity modulation is described.

In digital gradation display by intensity modulation, subfields of an equal time are allocated time-divisionally to the individual bit planes within the time of one frame. However, in each subfield, light of an intensity corresponding to the weight of the bit plane is emitted as illustrated in FIG. 12A.

For example, if the intensity of light emitted in the subfield of the bit plane B7 is represented by 1, then light of the intensity of 0.5 is emitted in the subfield of the bit plane B6; light of the intensity of 0.25 is emitted in the subfield of the bit plane B5; light of the intensity of 0.125 is emitted in the subfield of the bit plane B4; light of the intensity of 0.0625 is emitted in the subfield of the bit plane B3; light of the intensity of approximately 0.031 is emitted in the subfield of the bit plane B2; light of the intensity of approximately 0.016 is emitted in the subfield of the bit plane B1; and light of the intensity of approximately 0.008 is emitted in the subfield of the bit plane B0.

It is to be noted that, if one frame rate is, for example, 60 Hz and accordingly the time of one frame is all allocated to the subfields, then the time of each subfield is approximately 2.1 milliseconds ($\approx$16.67 milliseconds/8). Further, in FIG. 12A, within the time of one frame, the subfields of the bit planes B0 to B7 are successively allocated from the top.

For example, where the gradation of 77 is represented by digital gradation display by intensity modulation, since the binary representation of it is 01011101B as given hereinabove, the light source or the light valve as the pixel is controlled, as illustrated in FIG. 12B, to on in the subfield of the bit plane B0, to off in the subfield of the bit plane B1, to on in the subfields of the bit planes B2 and B3, to off in the subfields of the bit planes B4 and B5, to on in the subfield of the bit plane B6, and to off in the subfield of the bit plane B7. As a result, light of a light amount (luminance) obtained by time integrating results of multiplication of FIGS. 12A and 12B within the time of one frame is emitted from the pixel corresponding to the light source.

From the foregoing description, by whichever one of pulse width modulation and intensity modulation digital gradation display is performed, since subfields are allocated time-divisionally to individual bit planes, the light emission timing corresponding to a bit of a certain bit plane and the light emission timing corresponding the bit of another bit plane do not coincide with each other but are displaced from each other.

In particular, where gradations of, for example, 127 and 128 are to be displayed, since the binary representation of the "127" gradation is 01111111B, light is emitted in all of the subfields of the bit planes B0 to B6 to display the gradation, and since the binary representation of the "128" gradation is 00000001B, light is emitted in the subfield of the bit plane B7 to display the gradation. Accordingly, for example, where the "127" and "128" gradations are digital gradation displayed by pulse width modulation, the timing at which emission of light of the "127" gradation is started and the timing at which emission of light of the "128" gradation is started have a time lag of approximately 8.4 milliseconds ($\approx$65 microseconds+125 microseconds+250 microseconds+0.5 milliseconds+1 millisecond+2.1 milliseconds+4.2 milliseconds) (FIG. 10A). On the other hand, where the "127" and "128" gradations displayed by digital gradation display by intensity modulation, the timing at which emission of light of the "127" gradation is started and the timing at which emission of light of the "128" gradation is started have a time lag of approximately 14.7 milliseconds (=2.1 milliseconds×7) (FIG. 12A).

Figure 13A:
FIGS. 13A and 13B are schematic views showing a moving picture pseudo contour.
Figure 13B:
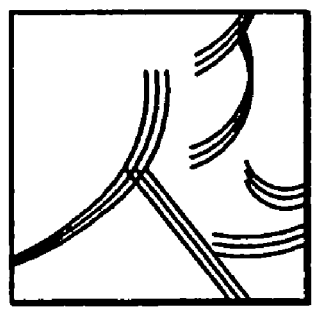

Accordingly, for example, where such an image of the face of a person whose gradation varies gradually as shown in FIG. 13A is displayed by digital gradation display, if the person moves, then if a pixel from which light of the "127" gradation is emitted is used as a reference, then a pixel from which light of the "128" gradation is emitted is displaced from the original position of the pixel, and as a result, a bright line (hereinafter referred to as bright line) or a dark line (hereinafter referred to as dark line) appears like a contour line on the image as shown in an enlarged view of part of FIG. 13A shown in FIG. 13B. The bright line or dark line like a contour line is called moving picture pseudo counter.

Figure 14A:
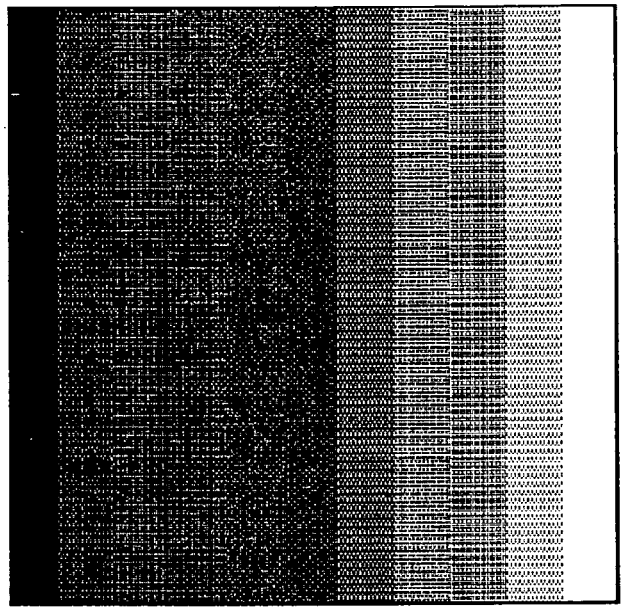
FIGS. 14A and 14B are schematic views showing an evaluation image.

In order to evaluate the degree of the moving picture pseudo contour, such an image (hereinafter referred to as evaluation image) as shown in FIG. 14A is considered.

The evaluation image of FIG. 14A is a square image of 512×512 pixels in rows×columns, and the gradation of the left end is "0" and the gradation successively varies by one for every two pixels in the rightward direction from the left. Accordingly, the gradation of a pixel at the right end of the square of FIG. 14A is "255". It is to be noted that the gradations in the vertical direction (column direction) of the evaluation image are same in each column.

Figure 14B:
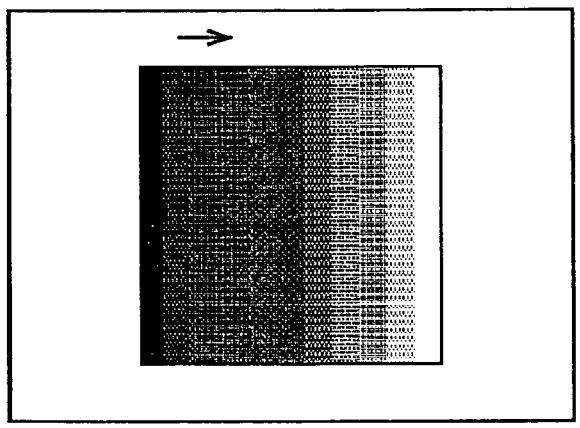

Further, since a moving picture pseudo contour appears on an image which includes some movement, the evaluation image must be moved. Thus, the evaluation image is moved in the rightward direction from the left by a distance of 10 pixels per the time of one frame as shown in FIG. 14B. Accordingly, where the frame rate is, for example, 60 Hz, the evaluation image is moved in the rightward direction from the left by a distance of 600 pixels (=10 pixels×60 Hz) in one second.

It is to be noted that, where the evaluation image is displayed on a screen of 640×480 pixels, it is moved from the left end to the right end of the screen in approximately 1.1 seconds (=640 pixels/600 pixels). On the other hand, where the evaluation image is displayed on a screen of 800 pixels×600 pixels, another screen of 1,024 pixels×768 pixels, a further screen of 1,280 pixels×1,024 pixels and a still further screen of 1,600 ×1,200 pixels, the evaluation image is moved from the left end to the right end of the screen in approximately 1.3 seconds, 1.7 seconds, 2.1 seconds and 2.6 seconds, respectively.

Where such an evaluation image as described above is displayed on the display apparatus of FIG. 5, in order to make the relationship between the gradation and the lightness index number substantially linear as shown in FIG. 9B, the gradation must be multiplied by a gamma value of approximately 2.2. Therefore, values obtained by multiplying the gradations of "0" to "255" illustrated in FIG. 15A by a gamma value of 2.2 are illustrated in FIG. 15B. Further, in the present embodiment, since a pixel value is represented by (an integer of) 8 bits, the gradations multiplied by the gamma value and represented as integral values of 8 bits are illustrated in FIG. 15C. Further, the bits B0 to B7 where the integral values illustrated in FIG. 15C are represented as binary representations are illustrated in FIG. 15D.

As a method of preventing a moving picture pseudo contour, a method is available wherein a light amount corresponding to a bit of a predetermined bit plane is divided and light amounts (hereinafter referred to as divisional light amounts) obtained as a result of the division are distributed discretely within the time of one frame.

Figure 16C:
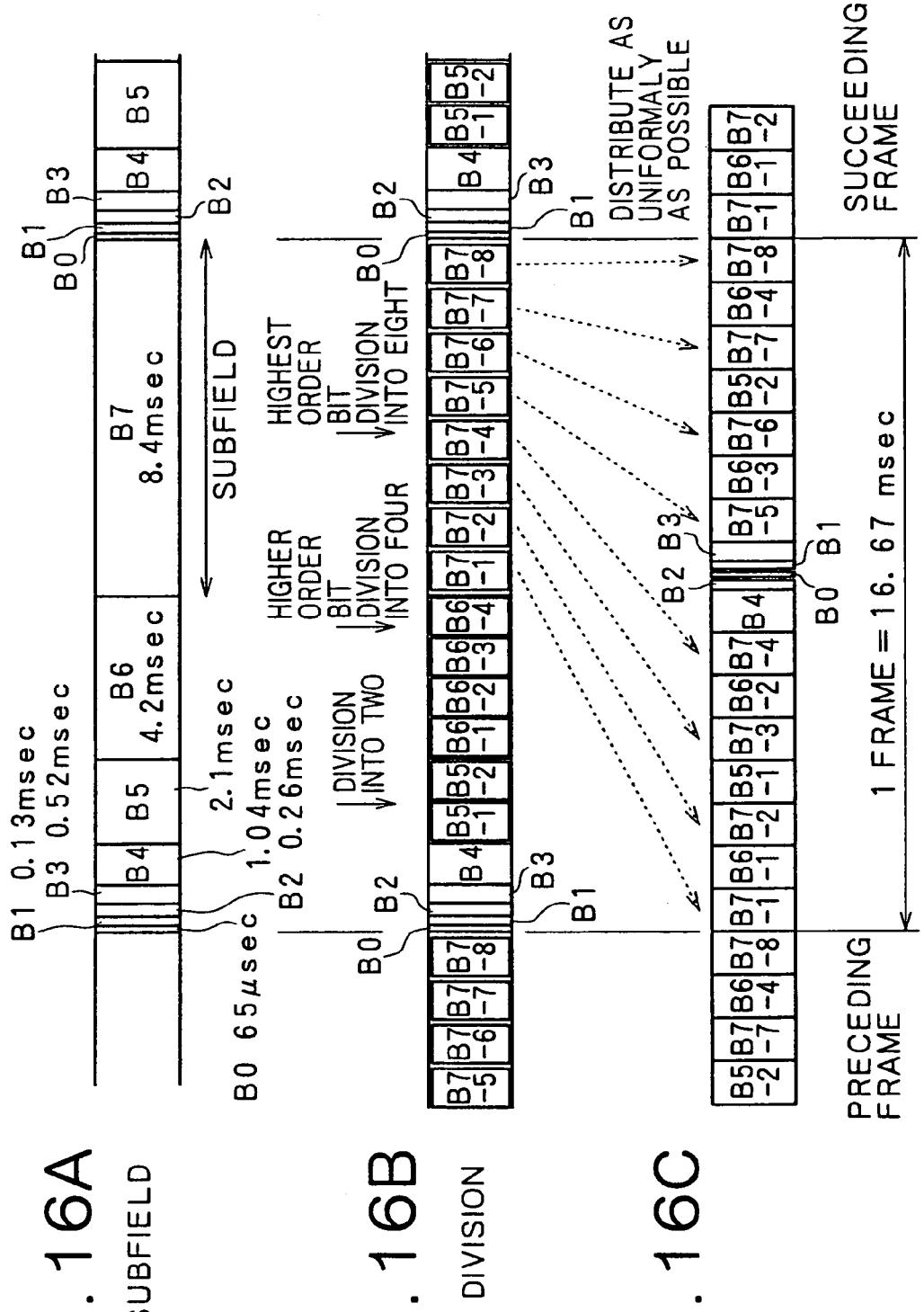

The light amount corresponding to a bit of a bit plane is a value obtained by integrating the intensity of light corresponding to the bit with the time (time of the subfields) allocated to the bit. Accordingly, as a method of dividing the light amount, a method of dividing the light amount in the direction of time and another method of dividing the light amount in the direction of intensity (level) are available. Where a digital gradation display system by pulse width modulation is used, basically the light amount is divided in the direction of time. However, where a digital gradation display system by intensity modulation is used, basically the light amount is divided in the direction of intensity. It is to be noted that, since light of the light amount divided in the intensity direction must be emitted somewhere within the time of one frame, where the light amount is divided in the intensity direction, the time of each subfield must be made short as much. For example, the light amount of the bit planes in the higher orders than the bit plane B4 in FIG. 12A is divided into light amounts equal to that of the subfield of the bit plane B4, the light amount of the bit plane B5 is divided into two, the light amount of the bit plane B6 is divided into four, and the light amount of the bit plane B7 is divided into eight. Accordingly, in this instance, since light of totaling 19 light amounts of five light amounts of the bit planes B0 to B4, two divisional light amounts of the bit plane B5, four divisional light amounts of the bit plane B6 and eight divisional light amounts of the bit plane B7 must be emitted, a subfield of one light amount is approximately 0.877 milliseconds ($\approx$16.67 milliseconds/19).

Where the light amount is divided in the time direction, if the light amount of the bit planes in the higher orders than the bit plane B4 is divided into light amounts equal to that of the subfield of the bit plane B4, then the light amount is divided in such a manner as illustrated in FIGS. 16A to 16C.

In particular, for example, if it is assumed that subfields similar to those in the case of FIG. 10A are allocated to the individual bit planes as illustrated in FIG. 16A, then the subfields of the bit planes in the higher orders than the bit plane B4 are divided into the same time length as that of the subfield of the bit plane B4 as shown in FIG. 16B. Consequently, the light amount of the bit plane B5 is divided into two, the light amount of the bit plane B6 is divided into four, and the light amount of the bit plane B7 is divided into eight.

Then, the divisional light amounts are arranged so as to be distributed discretely within the time of one frame as illustrated in FIG. 16C.

In the following description, the nth divisional light amount obtained by dividing the light amount of the bit plane B#i into N is suitably referred to as B#i–#n.

Figure 17:
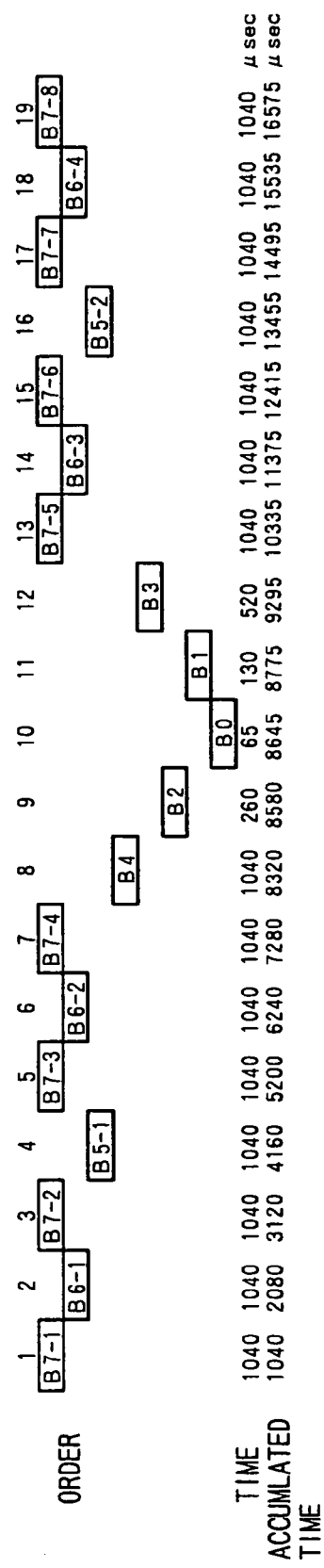
FIG. 17 is a diagrammatic view illustrating a light emission pattern of a pixel.

In this instance, the light emission pattern within the time of one frame is such as illustrated in FIG. 17. In particular, in this instance, the light emission pattern is, from the top of the time of one frame, B7-1, B6-1, B7-2, B5-1, B7-3, B6-2, B7-4, B4, B2, B0, B1, B3, B7-5, B6-3, B7-6, B5-2, B7-7, B6-4, B7-8.

Here, the times of the subfields B0 to B4 which are not divided are 65 microseconds, 130 microseconds, 260 microseconds, 520 microseconds, and 1,040 microseconds, respectively, as described hereinabove. Further, since all of the subfields B5-1 to B7-8 obtained by dividing the light amounts have the time width equal to that of the subfield B4, the time is 1,040 microseconds.

In FIG. 17, the accumulated time of the subfields distributed discretely within the time of one frame is 16,575 (=1,040+1,040+1,040+1,040+1,040+1,040+1,040+1,040+ 260+65+130+520+1,040+1,040+1,040+1,040+1,040+ 1,040+1,040) microseconds. Accordingly, the accumulated time is shorter by 92 microseconds than 16,677 microseconds which is the time of one frame, and within the time of 92 microseconds, the pixel is controlled to blank (dark). Further, the blank time is disposed, for example, at the last end of the time of one frame.

When the pixel is controlled to on/off in the light emission pattern illustrated in FIG. 17, if the evaluation image shown in FIG. 14A moves in the rightward direction from the left on the screen as described with reference to FIG. 14B, then the light amounts of the pixels of the columns on the screen are such as illustrated in FIGS. 18A and 18B.

Figure 1:
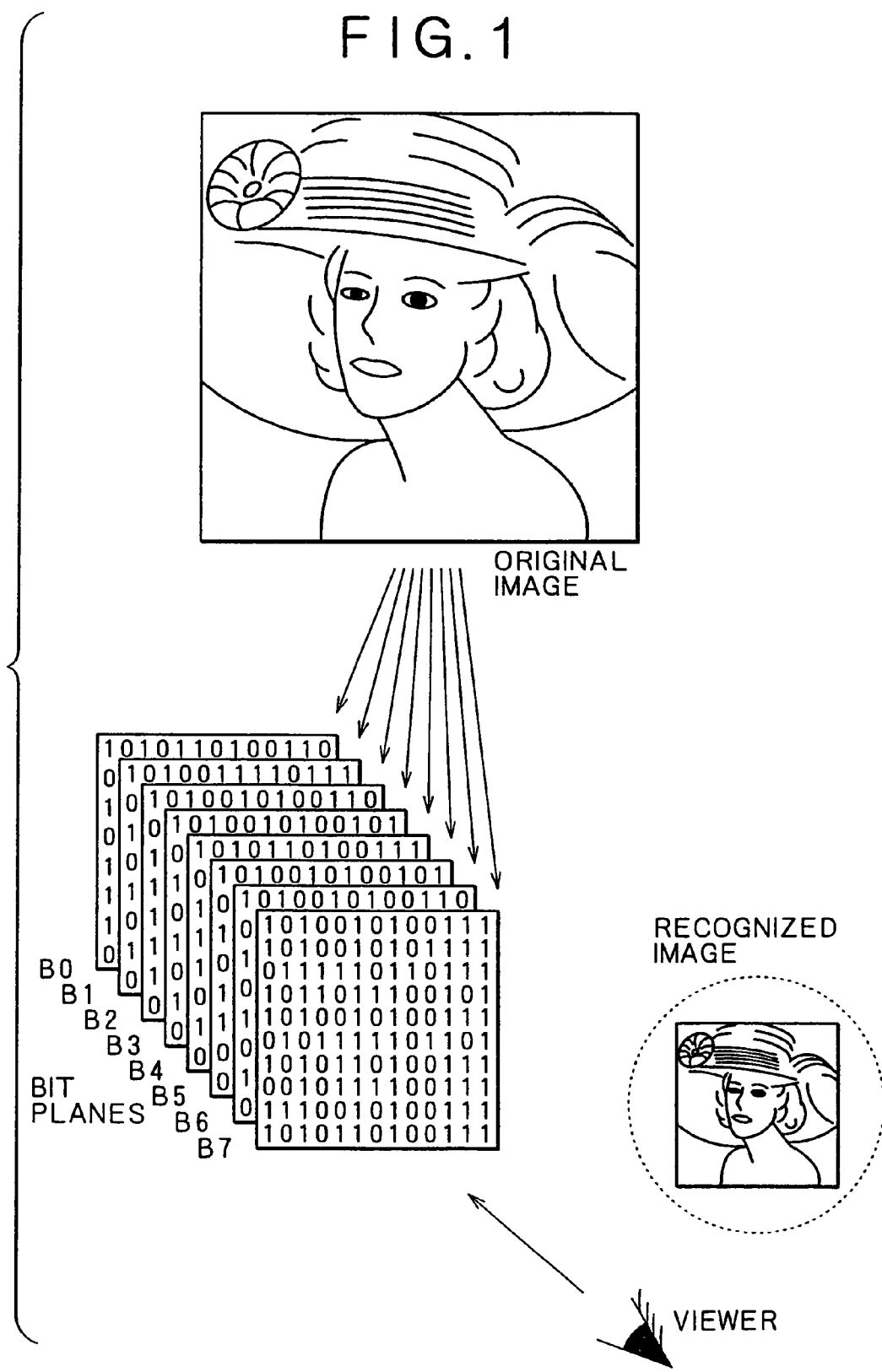
FIG. 1 is a schematic view illustrating digital gradation display by a plane sequential rewriting method.

In particular, FIG. 18A illustrates timings at which the pixels of the columns on a certain row (horizontal line) where the left end column on the screen is designated as the first column are controlled to on/off within the time of one frame. It is to be noted that, in FIG. 18A, 1 or 0 represents on or off, respectively.

Since the evaluation image moved rightwardly from the left by 10 pixels within the time of one frame, also the light emission timings of the individual pixels are displaced at the rate (10 pixels/frame). In FIG. 18A, that the 0s at the top which represent an off state exhibit a downward staircase shape represents such displacement in light emission timing.

The light amount of light of a pixel in each column is determined as a sum total of the light amounts of those subfields which represent 1 in the direction of a row of FIG. 18A. Where the light amounts of light of pixels of the columns are determined, they are such as illustrated in FIG. 18B. It is to be noted that the "light amount" in the first column in FIG. 18B represents the sum total of the light amounts of those subfields which are 1 in the individual rows of FIG. 18A while the "normalized light amount" of the second column represents values obtained by dividing the values in the "light amount" of the first column by 255 (the maximum value of the light amount of one pixel).

In this instance, if the lightness index numbers of the pixels from the first column to the 512th column on the screen are calculated in accordance with the expression (1) given hereinabove, such a result as illustrated in FIG. 19A is obtained. In FIG. 19A, the lightness index number increases or decreases like an impulse at some portions thereof, and a portion at which the lightness index number increases or decreases in this manner forms a bright line or a dark line, respectively, and makes a moving picture pseudo contour.

In regard to a printed matter, the state of it is evaluated with a color difference obtained from the lightness index number, and also the degree of the moving picture pseudo contour can be evaluated with the color difference.

Here, the color difference $\Delta E^*_{ab}$ can be determined using a color difference display method according to JIS Z 8730 in accordance with the following expression.

$$\Delta E^*_{ab}=((\Delta L^*)^2+(\Delta a^*)^2+(\Delta b^*)^2)^{1/2} \qquad (2)$$

where $\Delta L^*$ is a finite difference between the lightness index numbers $L^*$ of adjacent pixels, $\Delta a^*$ is a finite difference between the chromaticness index numbers $a^*$ of adjacent pixels, and $\Delta b^*$ is a finite difference between the chromaticness index numbers $b^*$ of adjacent pixels.

If it is assumed now that the display color is a single color, then the chromaticness index numbers $a^*$ and $b^*$ can be ignored. Accordingly, the color difference $\Delta E^*_{ab}$ is a finite difference of the lightness index numbers $L^*$ of adjacent pixels as represented by the following expression:

$$\Delta E^*_{ab}=\Delta L^* \qquad (3)$$

The color differences $\Delta E^*_{ab}$ as evaluation values for a moving picture pseudo contour determined in accordance with the expression (3) from the lightness index numbers of FIG. 19A are illustrated in FIG. 19B.

That the color difference $\Delta E^*_{ab}$ is small represents that a certain pixel and an adjacent pixel cannot be identified readily from each other and accordingly represents that, as regard the evaluation image of such a gradation pattern as shown in FIG. 14A, the gradation is smooth. On the contrary that the color difference $\Delta E^*_{ab}$ is great represents that a certain pixel and an adjacent pixel are much different from each other and accordingly represents that the degree of the moving picture pseudo contour is high.

Thus, if it is assumed now that the highest value of the absolute values of the color differences $\Delta E^*_{ab}$ is used as an index number (hereinafter referred to suitably as pseudo contour index number) representative of the degree of the moving picture pseudo contour, then the pseudo contour index number in the case of FIG. 19B is approximately 20.6.

In particular, if the light amount is divided in the direction of time as illustrated in FIG. 16B and the resulting divisional light amounts are distributed discretely in such a manner as illustrated in FIG. 16C, then the pseudo contour index number is approximately 20.6.

On the other hand, if the light amounts are merely divided in the direction of time in a similar manner as in the case of FIG. 16B but the divisional light amounts are placed at their original positions without discretely distributing them, then the pseudo contour index number can be determined in the following manner.

Here, the first column of FIG. 20A represents the bit plane of a pixel value to which 8 bits are allocated, and the second column represents the weight to the bit plane. Further, the third column represents the division number of the light amount corresponding to the bit of the bit plane, and the fourth column represents the weight after the division (=[weight of the second column]/[division number of the third column]). Furthermore, the fifth column represents the time of the subfield after the division, and the sixth column represents the time of the subfield after the division.

It is to be noted that the division number of 1 represents that the light amount is not divided.

FIG. 20B shows a light emission pattern of a pixel within the time of one frame. It is to be noted that, since, after division of the light amount, the divisional light amounts obtained by the division are not moved from the original positions, the light emission pattern here is substantially same as that in the case wherein the light amount is not divided.

Figure 21A:
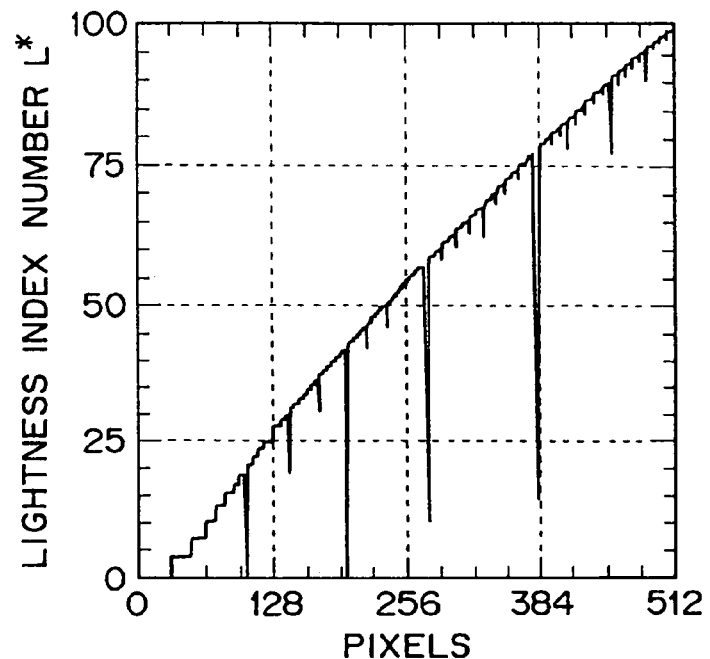
FIGS. 21A and 21B are diagrams illustrating further relationships of a luminance and a lightness index number to a gradation, respectively.
Figure 21B:
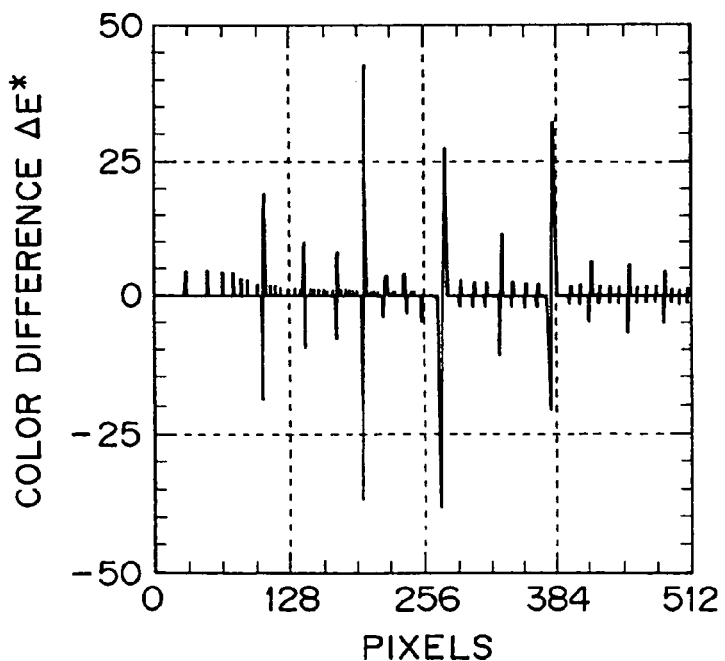

The lightness index numbers and the color differences in the case of FIGS. 20A and 20B are illustrated in FIGS. 21A and 21B. In particular, FIG. 21A represents the lightness index numbers and FIG. 21B represents the color differences.

From the color differences of FIG. 21B, it can be seen that the pseudo contour index number in the case of FIGS. 20A and 20B is approximately 42.7, and where the divisional light amounts are not distributed discretely, a moving picture pseudo contour is very striking when compared with the pseudo contour index number (20.6 as described with reference to FIG. 19B) in the case (FIG. 17) wherein the divisional light amounts are distributed discretely.

While, in the case described above, the light amounts are divided in the direction of time, the case wherein the light amounts are divided in the direction of intensity and the divisional light amounts are disposed discretely is described below.

For example, if the light amounts of the bit planes in the higher orders than the bit plane B4 in FIG. 12A are divided into light amounts equal to that of the subfield of the bit plane B4, then the light amount of the bit plane B5 is divided into two divisional light amounts B5-1 and B5-2; the light amount of the bit plane B6 is divided into four divisional light amounts B6-1 to B6-4; and the light amount of the bit plane B7 is divided into eight divisional light amounts B7-1 to B7-8. Then, the subfields (light amounts including divisional light amounts) are distributed such that the light emission pattern within the time of one frame is, from the top of the time of one frame, B7-1, B6-1, B7-2, B5-1, B7-3, B6-2, B7-4, B4, B2, B0, B1, B3, B7-5, B6-3, B7-6, B5-2, B7-7, B6-4, B7-8 similarly as in the case of FIG. 17.

The first to fourth columns of FIG. 22A represent the bit planes of a pixel value to which eight bits are allocated, the weights of the bit planes, the divisional numbers of the light amount corresponding to the bits of the bit planes, and the weights after the division, respectively.

FIG. 22B represents a light emission pattern from the top of the time of one frame.

Where a pixel is controlled to on/off in the light emission pattern illustrated in FIGS. 22A and 22B, in a state (stationary state) before the evaluation image shown in FIG. 14A starts its movement on the screen, the light amounts of the pixels in the individual columns on the screen are such as illustrated in FIGS. 23A and 23B.

In particular, FIG. 23A illustrates the timings at which the pixels in the difference columns on a certain row (horizontal line) where the column at the left end on the screen is determined as the first column are controlled to on/off within the time of one frame. It is to be noted that, in FIG. 23A, 1 and 0 represent on and off, respectively.

The light amount of light of a pixel in each column is determined as a sum total of the light amounts of those subfields which represent 1 in the direction of a row of FIG. 23A. Where the light amounts of light of pixels of the rows are determined, they are such as illustrated in FIG. 23B.

The "light amount" in the first column in FIG. 23B represents the sum total of the light amounts of those subfields which are 1 in the individual rows of FIG. 23A. In the present case, since the evaluation image is in a stationary state, the "light amount" in the first column is equal to the gradation (gradation multiplied by a gamma value) illustrated in FIG. 15C.

The "normalized light amount" of the second column in FIG. 23B represents values obtained by dividing the values in the "light amount" of the first column by 255, and the third column represents values obtained by multiplying the values of the "normalized light amount" of the second column by 100. Further, the fourth column and the fifth column represent the lightness index numbers and the color differences determined in accordance with the expressions (1) and (3) given hereinabove, respectively, from the values of the "light amount" of the first column.

Now, where a pixel is controlled to on/off in the light emission pattern illustrated in FIGS. 22A and 22B, when the evaluation image shown in FIG. 14A moves in the rightward direction from the left on the screen as described with reference to FIG. 14B, the light amounts of pixels in the columns on the screen are such as illustrated in FIGS. 24A and 24B.

In particular, FIG. 24A illustrates the timings at which the pixels in the different columns on a certain row (horizontal line) where the column at the left end on the screen is determined as the first column are controlled to on/off within the time of one frame. It is to be noted that, in FIG. 24A, 1 and 0 represent on and off, respectively.

Since the evaluation image moves from the left to the right by 10 pixels within the time of one frame, also the light emission timings of the individual pixels are displaced at the rate (10 pixels/frame). In FIG. 24A, that the 0s at the top which represent an off state exhibit a downward staircase shape represents such displacement in light emission timing.

Also in this instance, the light amount of light of a pixel in each column is determined as a sum total of the light amounts of those subfields which represent 1 in the direction of a row of FIG. 24A. Where the light amounts of light of pixels of the rows are determined in this manner, they are such as illustrated in FIG. 24B.

It is to be noted that the first to fifth columns in FIG. 23B represent the light amount, normalized light amount, normalized light amount multiplied by 100, lightness index number and color difference, respectively, similarly to the first to fifth columns in FIG. 23B.

As can be seen from comparison between the light amounts in the first column in FIG. 23B and the light amounts in the first column in FIG. 24B, when the evaluation image moves (FIGS. 24A and 24B), the light amounts of the pixels in the columns vary to higher or lower values with respect to those when the evaluation image does not move (FIGS. 23A and 23B), and such variations appear as a bright line or a dark line.

In the case of FIGS. 24A and 24B, if the lightness index numbers and the color differences of the pixels from the first column to the 512th column on the screen are calculated in accordance with the expressions (1) and (3), then such results as illustrated in FIGS. 25A and 25B are obtained. From the color differences of FIG. 25B, where the light amounts are divided in the direction of intensity and the divisional light amounts are disposed discretely in such a manner as illustrated in FIGS. 22A and 22B, the pseudo contour index number is 13.5.

Here, the color difference illustrated in FIG. 19B is obtained when the light amounts are divided in the direction of time and the divisional light amounts obtained as a result are distributed in such a manner as illustrated in FIG. 17, and the color differences illustrated in FIG. 25B are obtained when the light amounts are divided in the direction of intensity and the divisional light amounts obtained as a result are distributed in such a manner as illustrated in FIG. 22B. And, according to the color differences illustrated in FIG. 19B, the pseudo contour index number is 20.6, and according to the color differences illustrated in FIG. 25B, the pseudo contour index number is 13.5.

The light emission patterns shown in FIGS. 17, 22B are identical (however, since the times of the subfields are different, the light emission timings are different), and accordingly, even if the light emission pattern (light emission order) is the same, if the light emission timings are different, then also the pseudo contour index number exhibits a different value.

Figures 26A, 26B:
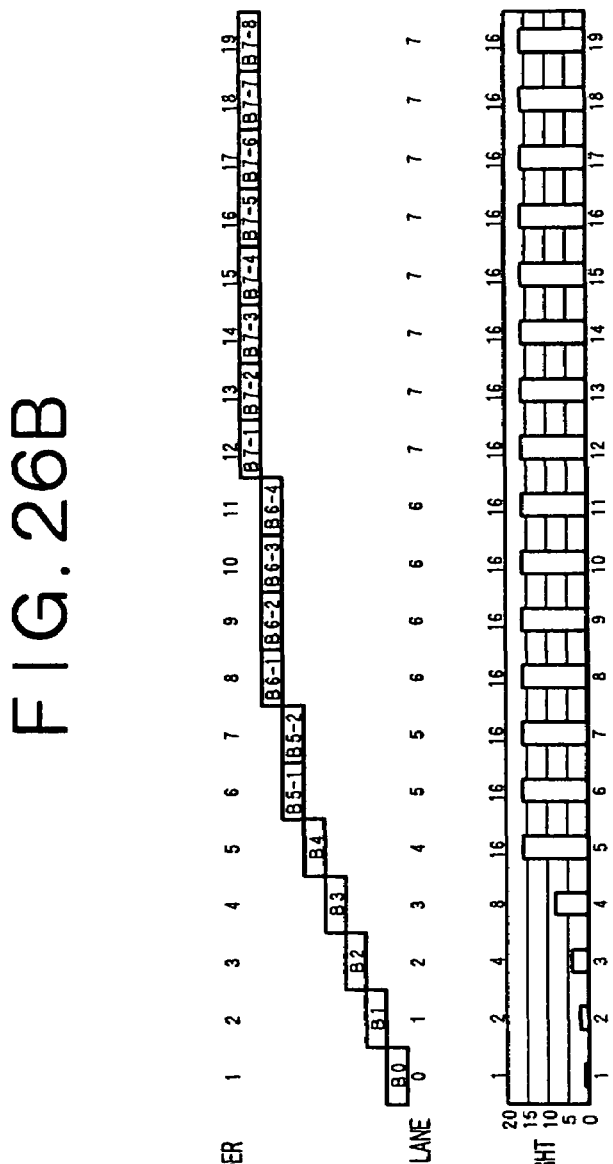
FIGS. 26A and 26B are diagrammatic views illustrating a still further light emission pattern of a pixel.

Here, if the light amounts are divided in the direction of intensity and the resulting divisional light amounts are not distributed but those of the bits of the same bit planes are collectively disposed as shown in FIGS. 26A and 26B, then the pseudo contour index number becomes such as follows.

It is to be noted that the first to fourth columns in FIG. 26A represent the bit planes of pixel values to which 8 bits are allocated, the weights to the bit planes, the division numbers of the light amounts corresponding to the bits of the bit planes, and the weights after the division similarly to the first to fourth columns of FIG. 20A, respectively.

Meanwhile, FIG. 26B illustrates a light emission pattern of a pixel within the time of one frame.

The lightness index numbers and the color differences in the case of FIGS. 26A and 26B are illustrated in FIGS. 27A and 27B. In particular, FIG. 27A represents the lightness index numbers and FIG. 27B represents the color differences.

From the color differences of FIG. 27B, it can be seen that the pseudo contour index number in the case of FIGS. 26A and 26B is approximately 30.1, and where the divisional light amounts are not distributed discretely and those of the bits of the same bit planes are disposed collectively (FIGS. 26A and 26B), a moving picture pseudo contour is very striking as apparently seen from comparison with the pseudo contour index number (13.5 as described hereinabove with reference to FIG. 25B) in the case where the divisional light amounts are distributed discretely (FIGS. 22A and 22B).

By the way, in the case described above, since, not only when the light amounts are divided in the direction of time but also when the light amounts are divided in the direction of intensity, the light amounts of the bit planes in the higher orders than the bit plane B4 are divided into light amounts equal to that of the subfield of the bit plane B4, each of the divisional light amounts is equal to the light amount of the subfield of the bit plane B4.

Where the light amounts of the bit planes are divided into equal divisional light amounts, the division number of the light amounts of a certain bit plane is twice the division number of the light amount of the bit plane of the lower order by one bit than the certain bit plane. In other words, since the weight of a certain bit plane is twice the weight of the bit plane of the lower order by one bit than the certain bit plane, if the divisional light amounts are set equal to each other, then the division number of the light amount of the certain bit plane is twice the division number of the light amount of the bit plane of the lower order by one bit than the certain bit plane.

On the other hand, a moving picture pseudo contour is liable to be influenced more by a bit of a bit plane of a higher order from the principle of appearance thereof, and appearances of a moving picture pseudo contour can be reduced basically by dividing the light amount of a bit plane of a higher order into a greater number of divisional light amounts and distributing the divisional light amounts discretely. However, even where the light amount of a bit plane of a higher order is divided into a greater number of divisional light amounts, if the divisional light amounts are disposed at positions spaced from divisional light amounts obtained by dividing the light amount of the bit plane of a lower order by one bit, then a moving picture pseudo contour appears strikingly.

Accordingly, in order to further reduce moving picture pseudo contours, it is necessary to distribute the divisional light amounts obtained by dividing the light amount of the bit plane of a higher order and the divisional light amounts obtained by dividing the light amount of the bit plane of a lower order by one bit at positions near to each other, preferably at positions adjacent each other. However, if the divisional light amounts are set equal to each other as described above, then since the division number of the light amounts of a certain bit plane is twice the division number of the light amounts of the bit plane of a lower order by one bit than the bit plane of the higher order, the division number of the light amount is much different between the bit plane of the high order and the bit plane of the lower order by one bit. As a result, it is difficult to distribute the divisional light amounts obtained by dividing the light amount of the bit plane of the high order and the divisional light amounts obtained by dividing the light amount of the bit plane of the lower order by one bit at positions near to each other.

Thus, if the light amount is divided so that the division number of the light amount of a certain bit plane may be less than twice the division number of the light amount of the bit plane of a lower order by one bit, that is, for example, the difference between the division number of the light amount of a certain bit plane and the division number of the light amount of the bit plane of a lower order by one bit may be 0 or 1, then moving picture pseudo contours can be further reduced.

Figures 28A, 28B:
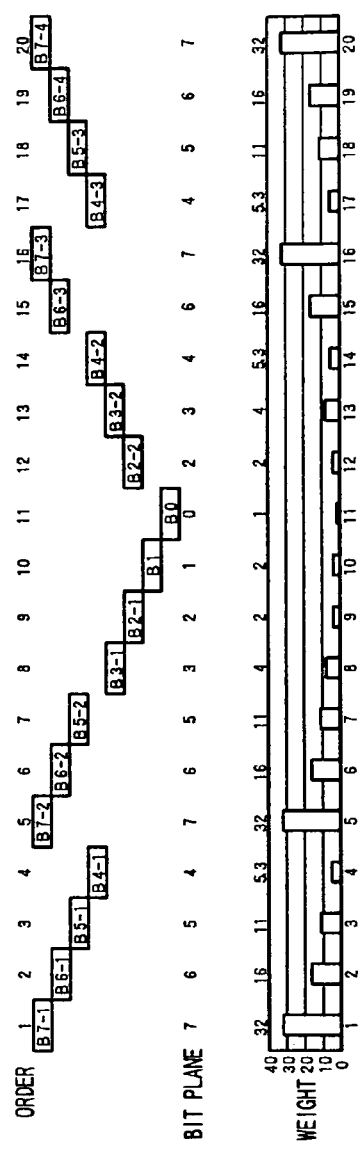
FIGS. 28A and 28B are diagrammatic views illustrating a yet further light emission pattern of a pixel.

FIGS. 28A and 28B show a first form of a division pattern of light amounts and a distribution pattern (light emission pattern) of the divisional light amounts, respectively. It is to be noted that FIGS. 28A and 28B show the division pattern and the distribution pattern, respectively, where the light amounts are divided in the direction of time.

Referring to FIG. 28A, the first to sixth columns represent the bit planes of a pixel value to which 8 bits are allocated, the weights to the bit planes, the division numbers of the light amounts corresponding to the bits of the bit planes, the weights after the division, the times of the subfields before the division, and the times of the subfields after the division similarly to those of the first to sixth columns of FIG. 20A, respectively.

In FIG. 28A, the light amounts of the bit planes B7 to B2 are divided into four, four, three, three, two and two divisional light amounts (although the light amounts of the bit planes B1 and B0 are not divided, for the convenience, their division numbers are represented as 1) respectively. Accordingly, the difference between the division numbers of the light amounts of adjacent bits (a certain bit and another bit of a higher or lower order by one bit) from among the bits of the bit planes B7 to B2 whose light amounts are divided is either 0 or 1.

In this instance, the light emission pattern of a pixel within the time of one frame can be, for example, from the top of the time of one frame, B7-1, B6-1, B5-1, B4-1, B7-2, B6-2, B5-2, B3-1, B2-1, B1, B0, B2-2, B3-2, B4-2, B6-3, B7-3, B4-3, B5-3, B6-4, B7-4 as illustrated in FIG. 28B. Thus, the division light amounts obtained by dividing the light amount of a bit plane of a high order and the division light amounts obtained by division of the light amount of another bit plane of a lower order by one bit can be distributed near to each other.

Figure 29A:
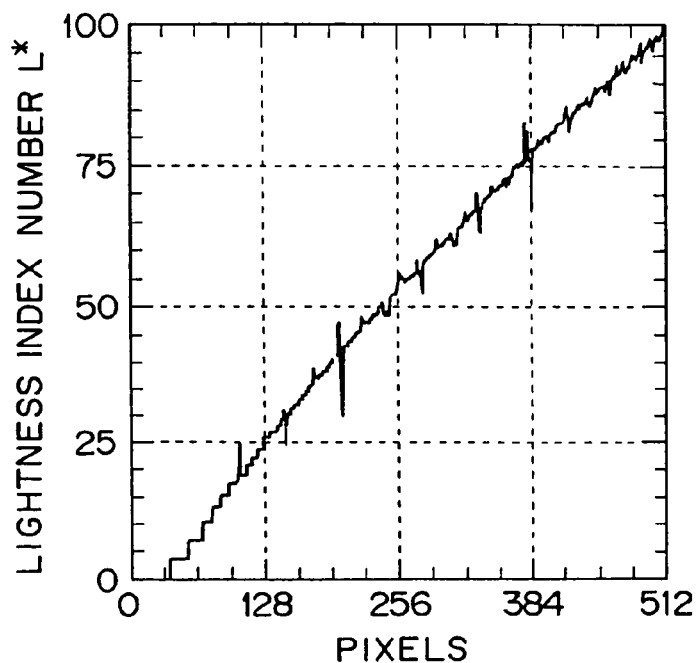
FIGS. 29A and 29B are diagrams illustrating yet further relationships of a luminance and a lightness index number to a gradation, respectively.
Figure 29B:
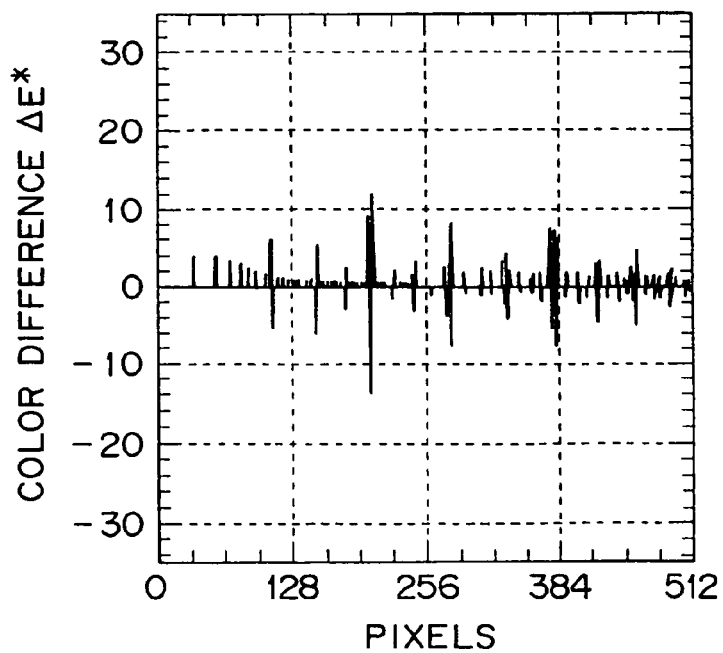

The lightness index numbers and the color differences of the evaluation image in the case of FIGS. 28A and 28B are illustrated in FIGS. 29A and 29B, respectively. In particular, FIG. 29A represents the lightness index numbers and FIG. 29B represents the color differences.

From the color differences of FIG. 29B, it can be seen that the pseudo contour index number in the case of FIG. 28 is approximately 12.2. On the other hand, since the pseudo contour index number where the light amounts are divided into divisional light amounts of an equal value in the direction of time and the divisional light amounts are distributed discretely (FIG. 17) is 20.6 as described above with reference to FIG. 19B, according to the division pattern and the distribution pattern of FIG. 28B, moving picture pseudo contours can be further reduced.

FIGS. 30A and 30B show a second form of a division pattern of light amounts and a distribution pattern (light emission pattern) of the divisional light amounts, respectively. It is to be noted that also FIGS. 30A and 30B show the division pattern and the distribution pattern where the light amounts are divided in the direction of time.

Referring to FIG. 30A, the first to sixth columns represent the bit planes of a pixel value to which 8 bits are allocated, the weights to the bit planes, the division numbers of the light amounts corresponding to the bits of the bit planes, the weights after the division, the times of the subfields before the division, and the times of the subfields after the division similarly to those of the first to sixth columns of FIG. 20A, respectively.

In FIG. 30A, the light amounts of the bit planes B7 to B1 are divided into four, three, three, three, two, two and two divisional light amounts (although the light amount of the bit plane B0 is not divided, for the convenience, its division number is represented as 1), respectively. Accordingly, the difference between the division numbers of the light amounts of adjacent bits (a certain bit and another bit of a higher or lower order by one bit) from among the bits of the bit planes B7 to B1 whose light amounts are divided is either 0 or 1.

In this instance, the light emission pattern of a pixel within the time of one frame can be, for example, from the top of the time of one frame, B7-1, B6-1, B5-1, B4-1, B3-1, B2-1, B7-2, B6-2, B4-2, B1-1, B0, B1-2, B5-2, B7-3, B2-2, B3-2, B4-3, B5-3, B6-3, B7-4 as illustrated in FIG. 30B. Thus, the division light amounts obtained by dividing the light amount of a bit plane of a high order and the division light amounts obtained by division of the light amounts of another bit plane of a lower order by one bit can be arranged near to each other.

The lightness index numbers and the color differences of the evaluation image in the case of FIGS. 30A and 30B are illustrated in FIGS. 31A and 31B, respectively. In particular, FIG. 31A represents the lightness index numbers and FIG. 31B represents the color differences.

From the color differences of FIG. 31B, it can be seen that the pseudo contour index number in the case of FIGS. 30A and 30B is approximately 9.5. On the other hand, since the pseudo contour index number where the light amounts are divided into visional light amounts of an equal value in the direction of time and the divisional light amounts are distributed discretely (FIG. 17) is 20.6 as described above with reference to FIG. 19B, according to the division pattern and the distribution pattern of FIG. 30B, moving picture pseudo contours can be further reduced likewise.

Figure 32A:
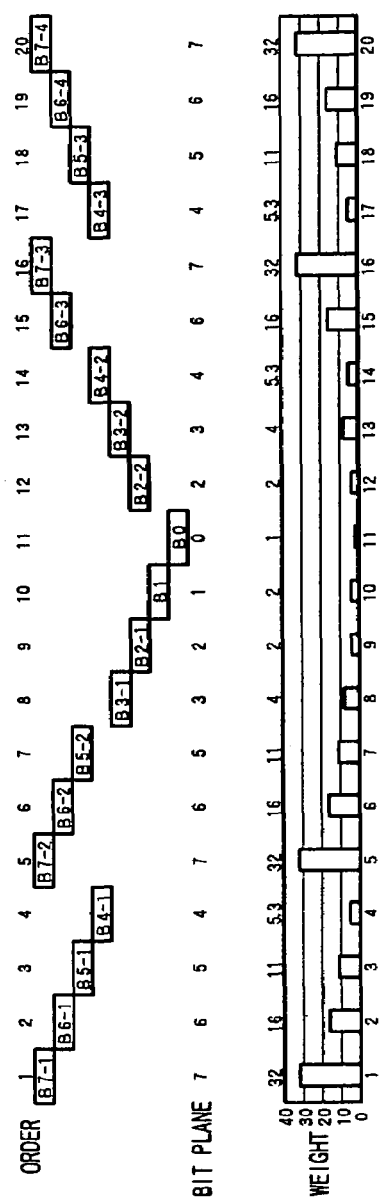
FIGS. 32A and 32B are diagrammatic views illustrating a yet further light emission pattern of a pixel.
Figure 32B:
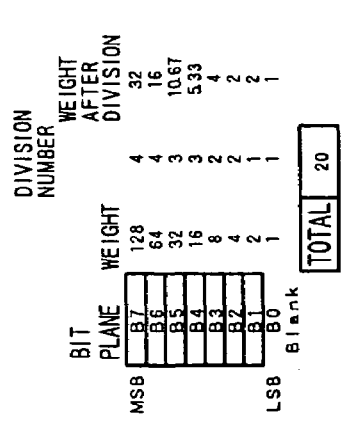

FIGS. 32A and 32B show a third form of a division pattern of light amounts and a distribution pattern (light emission pattern) of the divisional light amounts, respectively. It is to be noted that FIGS. 32A and 32B show the division pattern and the distribution pattern, respectively, where the light amounts are divided in the direction of intensity.

Referring to FIG. 32A, the first to fourth columns represent the bit planes of a pixel value to which 8 bits are allocated, the weights to the bit planes, the division numbers of the light amounts corresponding to the bits of the bit planes, and the weights after the division similarly to those of the first to fourth columns of FIG. 20A, respectively.

In FIG. 32A, the light amounts of the bit planes B7 to B2 are divided into four, four, three, three, two and two divisional light amounts (although the light amounts of the bit planes B1 and B0 are not divided, for the convenience, their division numbers are represented as 1), respectively, similarly as in the case of FIG. 28A. Accordingly, the difference between the division numbers of the light amounts of adjacent bits (a certain bit and another bit of a higher or lower order by one bit) from among the bits of the bit planes B7 to B2 whose light amounts are divided is either 0 or 1.

In this instance, the light emission pattern of a pixel within the time of one frame can be, for example, from the top of the time of one frame, B7-1, B6-1, B5-1, B4-1, B7-2, B6-2, B5-2, B3-1, B2-1, B1, B0, B2-2, B3-2, B4-2, B6-3, B7-3, B4-3, B5-3, B6-4, B7-4 as illustrated in FIG. 32B. Thus, the division light amounts obtained by dividing the light amount of a bit plane of a high order and the division light amounts obtained by division of the light amount of another bit plane of a lower order by one bit can be arranged near to each other. It is to be noted that, although the light emission pattern of FIG. 32B is the same as the light emission pattern of FIG. 28B, since the times of the subfields are different, the light emission timings are different.

The lightness index numbers and the color differences of the evaluation image in the case of FIGS. 32A and 32B are illustrated in FIGS. 33A and 33B, respectively. In particular, FIG. 33A represents the lightness index numbers and FIG. 33B represents the color differences.

From the color differences of FIG. 33B, it can be seen that the pseudo contour index number in the case of FIGS. 32A and 32B is approximately 7.4. On the other hand, since the pseudo contour index number where the light amounts are divided into visional light amounts of an equal value in the direction of intensity and the divisional light amounts are distributed discretely (FIG. 22B) is 13.5 as described above with reference to FIG. 25B, according to the division pattern and the distribution pattern of FIG. 32B, moving picture pseudo contours can be further reduced.

FIGS. 34A and 34B show a fourth form of a division pattern of light amounts and a distribution pattern (light emission pattern) of the divisional light amounts, respectively. It is to be noted that also FIGS. 34A and 34B shows the division pattern and the distribution pattern, respectively, where the light amounts are divided in the direction of intensity.

Referring to FIG. 34A, the first to fourth columns represent the bit planes of a pixel value to which 8 bits are allocated, the weights to the bit planes, the division numbers of the light amounts corresponding to the bits of the bit planes, and the weights after the division similarly to those of the first to fourth columns of FIG. 20A, respectively.

In FIG. 34A, the light amounts of the bit planes B7 to B1 are divided into four, three, three, three, two, two and two divisional light amounts (although the light amount of the bit plane B0 is not divided, for the convenience, its division number is represented as 1), respectively, similarly as in the case of FIG. 30A. Accordingly, the difference between the division numbers of the light amounts of adjacent bits (a certain bit and another bit of a higher or lower order by one bit) from among the bits of the bit planes B7 to B1 whose light amounts are divided is either 0 or 1.

In this instance, the light emission pattern of a pixel within the time of one frame can be, for example, from the top of the time of one frame, B7-1, B6-1, B5-1, B4-1, B3-1, B2-1, B7-2, B6-2, B4-2, B1-1, B0, B1-2, B5-2, B7-3, B2-2, B3-2, B4-3, B5-3, B6-3, B7-4 as illustrated in FIG. 34B. Thus, the division light amounts obtained by dividing the light amount of a bit plane of a high order and the division light amounts obtained by division of the light amounts of another bit plane of a lower order by one bit can be arranged near to each other. It is to be noted that, although the light emission pattern of FIG. 34 is the same as the light emission pattern of FIG. 30B, since the times of the subfields are different, the light emission timings are different.

Figure 35A:
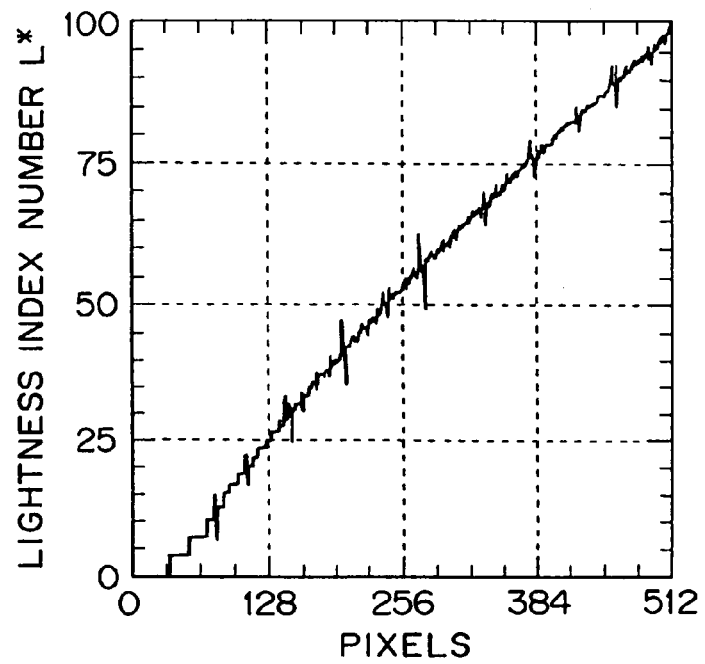
FIGS. 35A and 35B are diagrams illustrating yet further relationships of a luminance and a lightness index number to a gradation, respectively.
Figure 35B:
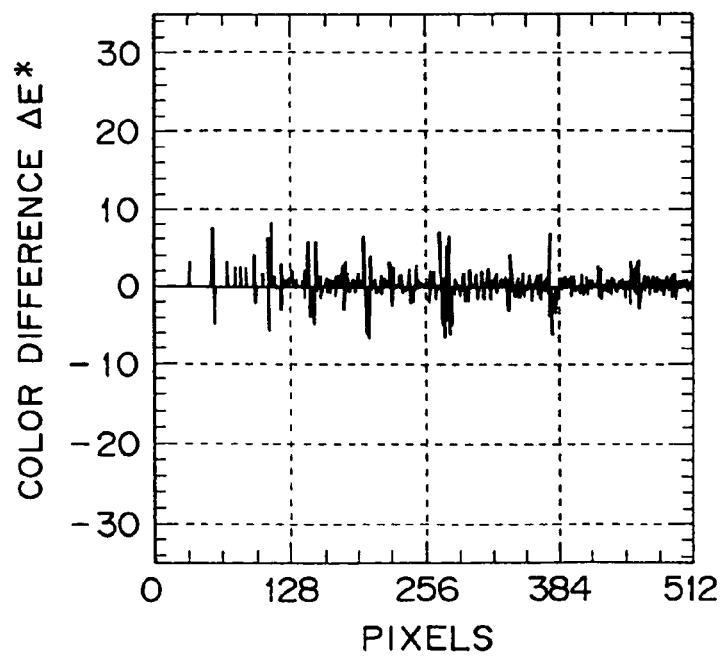

The lightness index numbers and the color differences of the evaluation image in the case of FIGS. 34A and 34B are illustrated in FIGS. 35A and 35B. In particular, FIG. 35A represents the lightness index numbers and FIG. 35B represents the color differences.

From the color differences of FIG. 35B, it can be seen that the pseudo contour index number in the case of FIGS. 34A and 34B is approximately 9.0. On the other hand, since the pseudo contour index number where the light amounts are divided into visional light amounts of an equal value in the direction of intensity and the divisional light amounts are distributed discretely (FIGS. 22A and 22B) is 13.5 as described above with reference to FIG. 25B, according to the division pattern and the distribution pattern of FIG. 34B, moving picture pseudo contours can be further reduced.

From the foregoing, where both of a light amount (hereinafter referred to suitably as higher order light amount) corresponding to a bit plane of a higher order and a light amount (hereinafter referred to as lower order light amount) corresponding to a bit plane of a lower order by one bit are divided, the signal production circuit 35 divides the higher order light amount and the lower order light amount so that the division number of the upper order light amount may be smaller than the division number of the lower order light amount and produces a drive signal for driving the display section 36 so that light of the divisional light amounts obtained as a result of the division may be emitted discretely within the time of one frame. Consequently, occurrences of a moving picture pseudo counter in digital gradation display can be reduced (suppressed) simply. As a result, it is possible to provide moving pictures of a high picture quality.

Further, where the higher order light amount and the lower order light amount are divided so that the division number of the higher order light amount may be smaller than the division number of the lower order light amount, increase of the total division number can be suppressed, and accordingly, pixels need not be switched on/off at a very high speed. In particular, in the forms of FIGS. 28A, 28B and 30A, 30B described hereinabove, the division number of the light amount of, for example, the bit plane B7 of the highest order is four, and the subfield time of each divisional light amount is 2,080 microseconds which is approximately ⅛ the time (16.67 milliseconds) of one frame, and therefore, the pixels need not be switched on/off at a very high speed. Accordingly, a comparatively less expensive device can be used for the display section 36.

Further, while, in the present embodiment, the subfield of a divisional light amount obtained by dividing a light amount is a short time when compared with the original subfield, since the sum total of the times of the subfields in one frame is equal to that where the light amount is not divided, the light utilization efficiency is not deteriorated.

It is to be noted that, while, in the forms of FIGS. 28B, 30B, 32B and 34B, the divisional light amounts are arranged so as to be symmetrical over the time of one frame, this is because it is intended to allow moving picture pseudo contours to be reduced to a similar degree irrespective of whether an image moves from the left to the right or moves conversely from the right to the left. Here, even where the higher order light amount and the lower order light amount are divided so that the division number of the higher order light amount may be smaller than twice the division number of the lower order light amount, since basically the division number of the light amount of the bit plane of the highest order is greatest, the divisional light amounts can be arranged so as to be symmetrical over the time of one frame by arranging a division light amount obtained by dividing the light amount of the bit plane of the highest order at the first and the last of the time of one frame.

It is to be noted that, where the display section 36 is formed from a liquid crystal panel, a liquid crystal panel which uses liquid crystal other than FLC can be adopted as the liquid crystal panel.

Further, the display section 36 can be formed from, for example, a CRT of the rear type, an EL (Electro Luminescence) of an image display panel of the self-illumination type, an LED array display panel on which LEDs corresponding to pixels are arrayed, an image display panel of the reflection type which does not use polarized light and a light source for irradiating upon the image display panel, an on-off type image display panel or the like.

Furthermore, the division numbers of the light amounts, the light emission pattern of light of the divisional light amounts (the distribution pattern such as the distribution order and the distribution distance of the divisional light amounts) is not limited to those described above with reference to FIGS. 28B, 30B, 32B and 34B.

Further, while, in the present embodiment, digital gradation display is performed by the plane sequential rewriting system, it is possible to perform the digital gradation display by some other system such as a line sequential rewriting system or a point sequential rewriting system.

Furthermore, while, in the present embodiment, when the light amounts are divided in the direction of time, a blank time of 92 microseconds is provided, and the blank time is arranged at the last of the time of one frame. However, the blank time can be arranged at any other position. Also the blank time can be set to any other time than 92 microseconds.

Furthermore, in the present embodiment, when the light amounts are divided in the direction of time, the time of the subfield of the bit plane B0 is 65 microseconds and the shortest. However, a value other than 65 microseconds may be adopted as the minimum value of the time of a subfield.

While preferred embodiments of the present invention have been described using specific terms, such description is for illustrative purposes only, and it is to be understood that changes and variations may be made without departing from the spirit or scope of the following claims.

What is claimed is:

1. A display control apparatus for controlling a display apparatus which displays an image in digital gradation, the image being from a frame of a plurality of frames, the display control apparatus comprising:

inputting means for inputting digital values corresponding to pixel values which compose the image; and signal production means for producing a signal for driving said display apparatus so that the display apparatus emits a light including divisional light amounts in such a manner as to be distributed within a time corresponding to display of the frame, the light amounts being obtained by dividing light amounts corresponding to bits which compose the digital values, light amounts corresponding to higher order bits providing one of more and less light than light amounts corresponding to lower order bits, wherein when both of a first light amount of the light amounts corresponding to a predetermined bit of the bits that compose the digital values and a second light amount of the light amounts corresponding to a bit in a lower order by one bit to the predetermined bit are divided, the first and second light amounts are divided so that a difference between division numbers of the first and second light amounts of adjacent bits whose light amounts are divided is one of 0 and 1, including a case wherein at least one of the division numbers is greater than 2, thereby effecting a reduction of a moving picture pseudo contour in display of the image in digital gradation, wherein the display apparatus includes light emission means for emitting light of variable intensity, the light emission means including at least one light source for emitting the light with variable intensity and a light valve corresponding to each pixel that switches on or off to effect emission of the light from said light source, the light valve being driven by the signal from the signal production means.

2. A display control apparatus according to claim 1, wherein the light amounts corresponding to the bits are divided in a direction of time in which the light is emitted or in a direction of intensity of the light.

3. A display control apparatus according to claim 1, wherein said signal production means produces the signal for driving said display apparatus so that the light of the divisional light amounts obtained by dividing the light amounts corresponding to the bits may be emitted at timings at which the light may be symmetrical within the time corresponding to one screen.

4. A display control apparatus according to claim 1, wherein said signal production means produces the signal for driving said display apparatus so that the light of the divisional light amounts obtained by dividing the light amount corresponding to a predetermined bit and the light of the divisional light amounts obtained by dividing the light amount corresponding to a bit adjacent to the bit may be emitted at timings close to each other within the time corresponding to display of the frame.

5. A display control apparatus according to claim 1, wherein said signal production means produces the signal for driving said display apparatus so that the light of the divisional light amounts obtained by dividing the light amount corresponding to the most significant bit is emitted at least at the top and last timings within the time corresponding to display of the frame.

6. A display control apparatus according to claim 1, wherein said signal production means produces the signal for causing said light emission means to emit pulse width modulated light.

7. A display control apparatus according to claim 1, wherein said signal production means produces the signal for causing said light emission means to emit at least one of pulse width modulated light and intensity modulated light.

8. A display control apparatus according to claim 1, wherein said light emission means emits light of a plurality of color components.

9. A display control apparatus according to claim 1, wherein said signal production means produces the signal for causing digital gradation display by a plane sequential rewriting method to be performed.

10. A display control apparatus according to claim 1, wherein said signal production means produces the signal for causing said light emission means to emit intensity modulated light.

11. A display control method for controlling a display apparatus which displays an image in digital gradation, the image being from a frame of a plurality of frames, the method comprising:

an inputting step of receiving digital values corresponding to pixel values which compose the image; and a signal production step of producing a signal for driving said display apparatus so that the display apparatus emits a light including divisional light amounts in such a manner as to be distributed within a time corresponding to display of the frame, the light amounts being obtained by dividing light amounts corresponding to bits which compose the digital values, light amounts corresponding to higher order bits providing one of more and less light than light amounts corresponding to lower order bits;

wherein when both of a first light amount of the light amounts corresponding to a predetermined bit of the bits that compose the digital values and a second light amount of the light amounts corresponding to a bit in a lower order by one bit to the predetermined bit are divided, the first and second light amounts are divided so that a difference between division numbers of the first and second light amounts of adjacent bits whose light amounts are divided is one of 0 and 1, including a case wherein at least one of the division numbers is greater than 2, thereby effecting a reduction of a moving picture pseudo contour in display of the image in digital gradation, wherein the display apparatus includes light emission means for emitting light of variable intensity, the light emission means including at least one light source for emitting the light with variable intensity and a light valve corresponding to each pixel that switches on or off to effect emission of the light from said light source, the light valve being driven by the produced signal.

* * * * *